United States Patent [19]
Ishimura et al.

[11] Patent Number: 5,134,431
[45] Date of Patent: Jul. 28, 1992

[54] PHOTOGRAPHIC CAMERA INCLUDING A MEMORY FOR STORING ADJUSTMENT DATA AND A MEANS FOR ADJUSTING FUNCTIONS OF THE CAMERA BASED ON THE STORED ADJUSTMENT DATA

[75] Inventors: Toshihiko Ishimura, Habikino; Yasuaki Akada, Osaka; Hiroshi Ootsuka, Sakai; Norio Ishikawa, Osaka; Masaaki Nakai, Kawachinagano; Manabu Inoue, Kobe, all of Japan

[73] Assignee: Minolta Camera Kabushiki Kaisha, Osaka, Japan

[21] Appl. No.: 655,193

[22] Filed: Feb. 13, 1991

Related U.S. Application Data

[63] Continuation of Ser. No. 514,737, Apr. 3, 1990, abandoned, which is a continuation of Ser. No. 364,587, Jun. 12, 1989, abandoned, which is a continuation of Ser. No. 107,596, Oct. 13, 1987, abandoned.

[30] Foreign Application Priority Data

Oct. 14, 1986 [JP] Japan .................................. 61-243885
Oct. 14, 1986 [JP] Japan .................................. 61-243886
Oct. 14, 1986 [JP] Japan .................................. 61-243887

[51] Int. Cl.⁵ .................... G03B 7/08; G03B 7/083; G03B 13/36; G03B 15/05
[52] U.S. Cl. .................... 354/400; 354/410; 354/416; 354/427; 354/459
[58] Field of Search ............. 354/400, 402, 408, 406, 354/407, 410, 412, 413, 416, 417, 456, 425–428, 458, 464; 250/214 C, 214 L, 201.2, 201.4–201.8; 73/5; 358/225

[56] References Cited

U.S. PATENT DOCUMENTS

| | | | |
|---|---|---|---|
| 4,297,012 | 10/1981 | Nakai | 354/412 |
| 4,349,263 | 9/1982 | Uchidoi et al. | 354/458 X |
| 4,417,139 | 11/1983 | Kusaka | 354/406 X |
| 4,423,934 | 1/1984 | Lambeth et al. | 354/412 |
| 4,472,740 | 9/1984 | Doi | 358/225 |
| 4,629,304 | 12/1986 | Saegusa | 354/432 |
| 4,636,624 | 1/1987 | Ishida et al. | 354/406 X |
| 4,644,148 | 2/1987 | Kusaka et al. | 354/406 X |
| 4,733,265 | 3/1988 | Haraguchi et al. | 354/412 X |
| 4,737,814 | 4/1988 | Nakajima | 354/410 X |
| 4,812,869 | 3/1989 | Akashi et al. | 354/408 |

FOREIGN PATENT DOCUMENTS

| | | | |
|---|---|---|---|
| 55-147616 | 11/1980 | Japan . | |
| 56-155938 | 12/1981 | Japan . | |
| 169135 | 10/1983 | Japan | 354/410 |
| 204028 | 11/1984 | Japan | 354/410 |

Primary Examiner—W. B. Perkey
Attorney, Agent, or Firm—Burns, Doane, Swecker & Mathis

[57] ABSTRACT

A photographic camera having a photographic operating device including a focus detecting circuit, a shutter control circuit, a light measuring circuit and a light emission control circuit, an adjustment data memory for storing adjustment data based on functional characteristics of the respective circuits of the photographic operating device and an adjustment circuit for adjusting the respective circuits by using adjustment data read from the adjustment data memory. The adjustment data memory is consituted by an EEPROM for making it possible to conveniently and readily rewrite the adjustment data. The adjustment data is calculated from a linear function expression established between a design value and an actual value for avoiding trial-and-error preparatory operations for the adjustment.

17 Claims, 28 Drawing Sheets

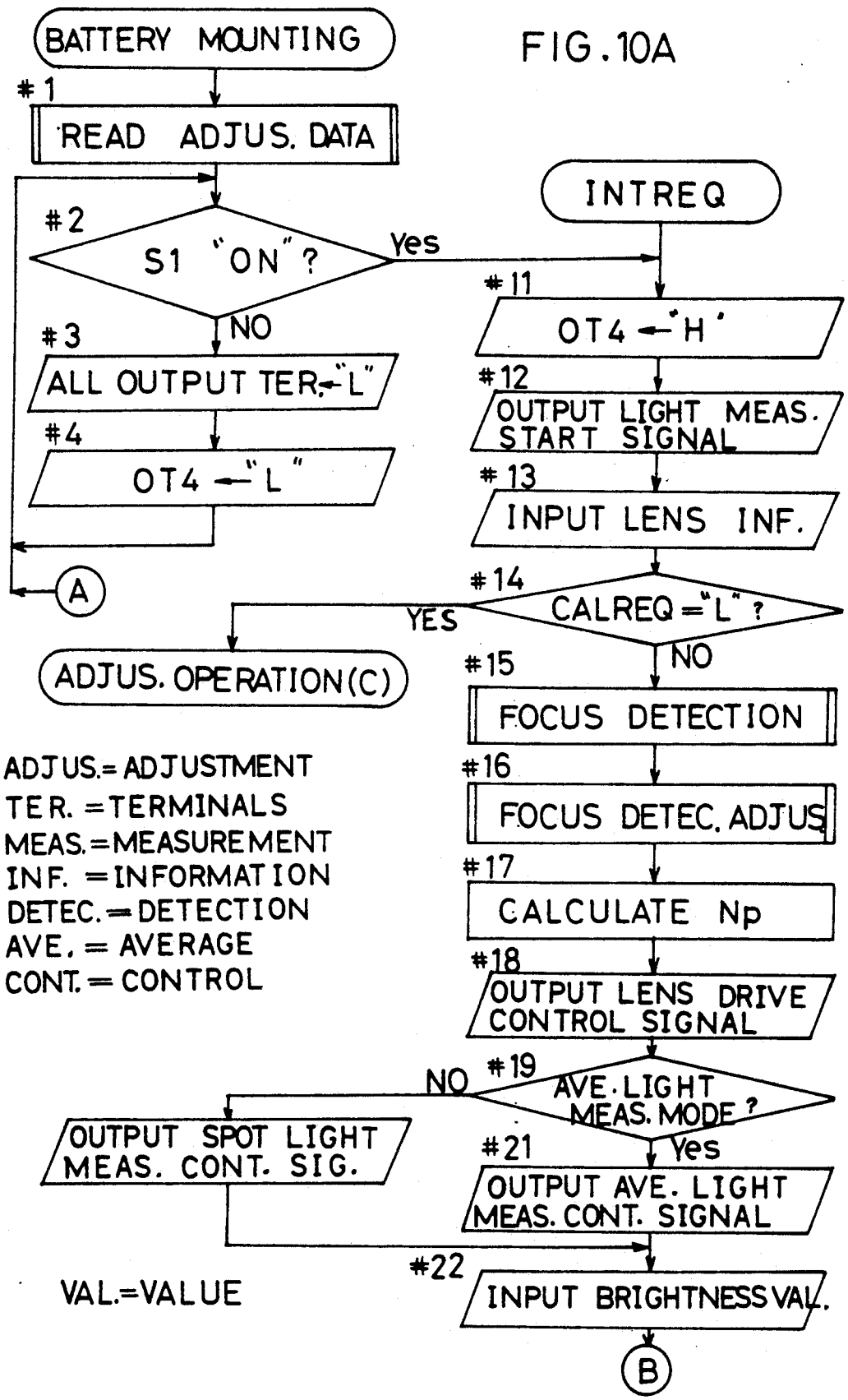

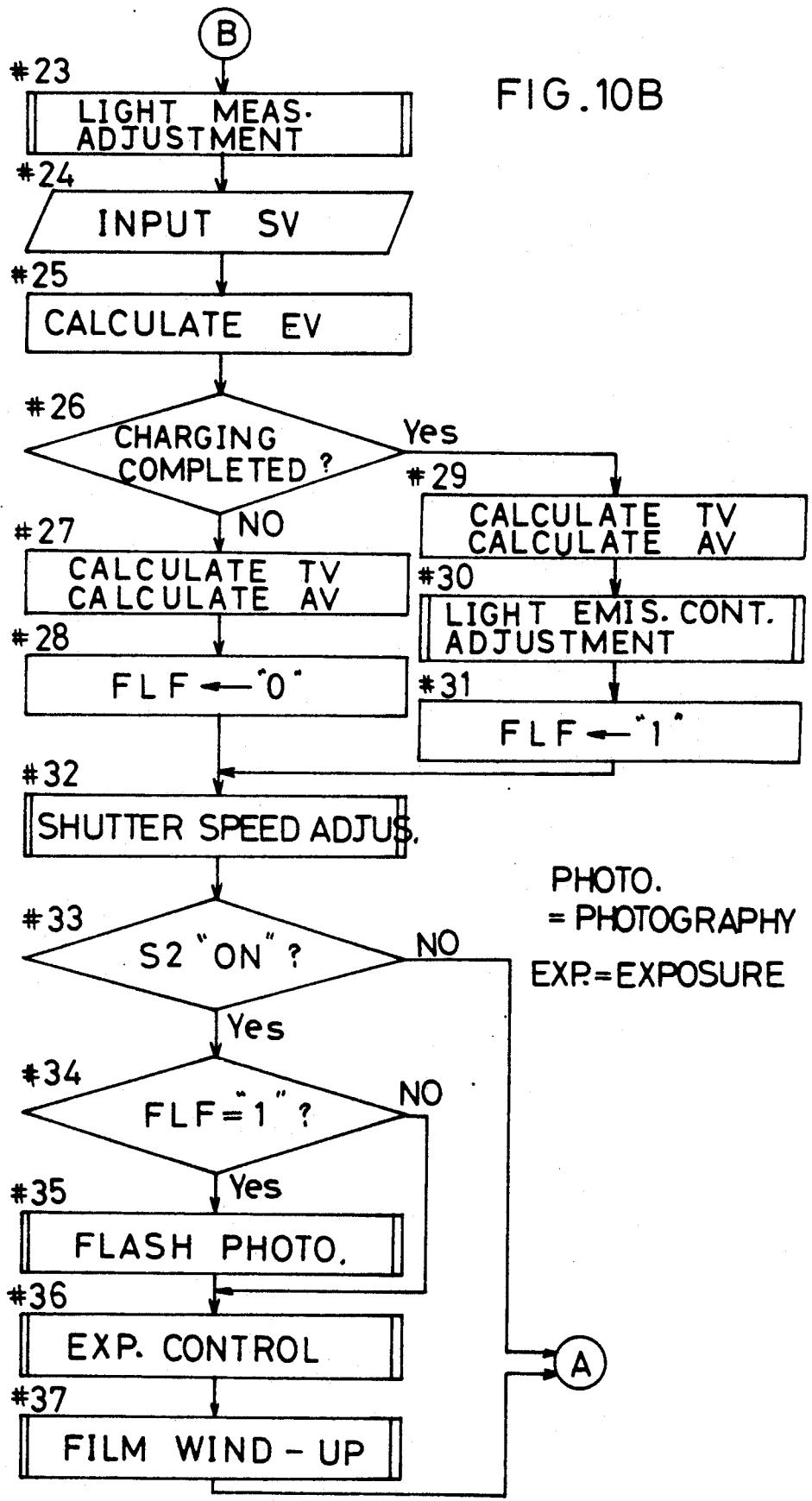

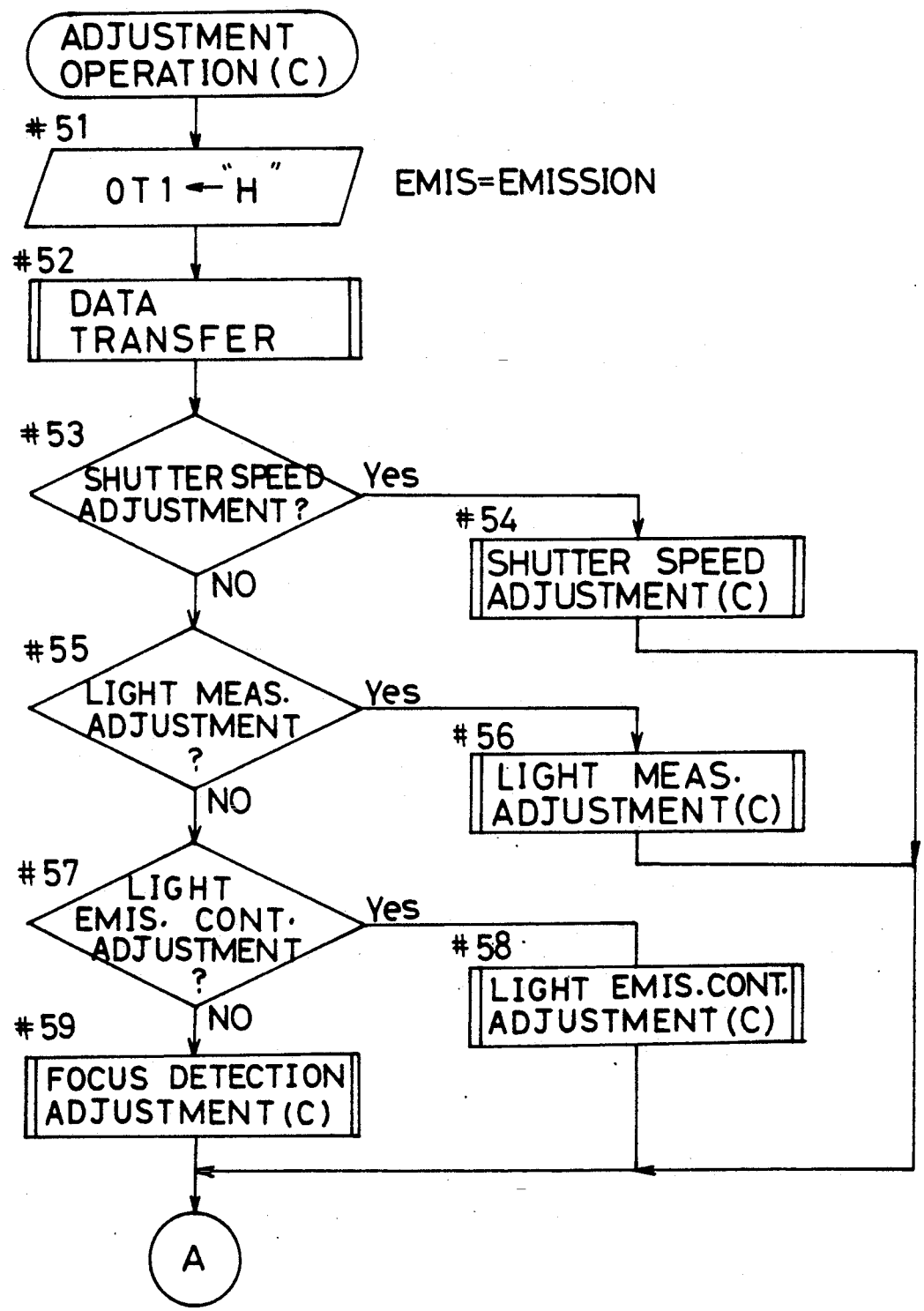

DETEC. = DETECTION
SIG. = SIGNAL
INTEG. = INTEGRATION

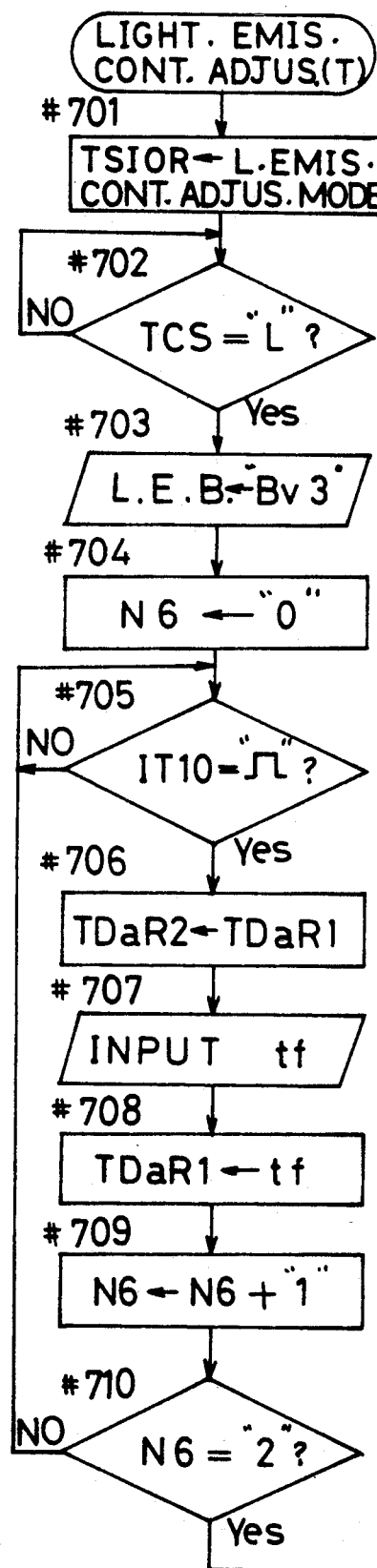
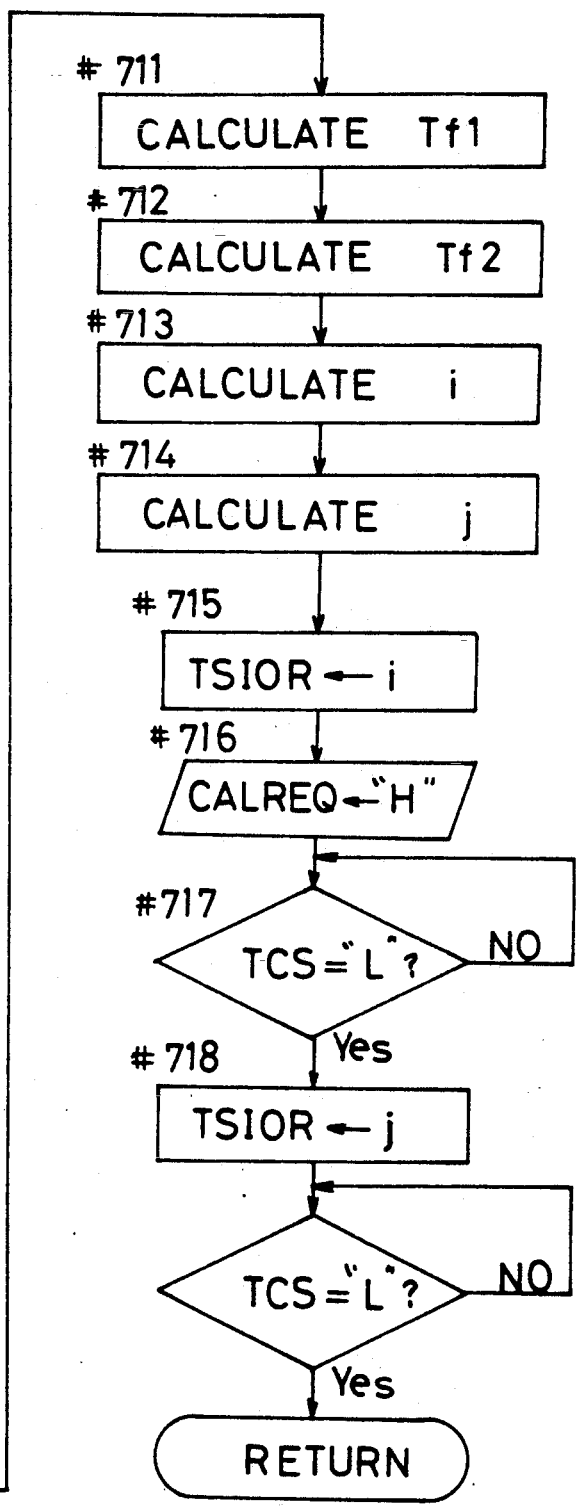
FIG. 27

PHOTOGRAPHIC CAMERA INCLUDING A MEMORY FOR STORING ADJUSTMENT DATA AND A MEANS FOR ADJUSTING FUNCTIONS OF THE CAMERA BASED ON THE STORED ADJUSTMENT DATA

This application is a continuation of application Ser. No. 07/504,737, filed Apr. 3, 1990, (now abandoned), which is a continuation of Ser. No. 07/364,587, filed Jun. 12, 1989 (now abandoned), which is a continuation of Ser. No. 07/107,596, filed Oct. 13, 1987 (now abandoned).

BACKGROUND OF THE INVENTION

1. Field of the Invention

The present invention relates to a photographic camera having adjustment data memory means for storing adjustment data based on pre-measured functional characteristics data of photographic operating devices and adjustment means for adjusting functions of the photographic operating devices based on the adjustment data stored in the memory means such that adverse effects due to errors or tolerances of the photographic operating devices on a photographic image may be prevented.

2. Description of the Prior Art

A conventional photographic camera of the above-described type is disclosed, e.g. in a Japanese laid-open patent application published under No. 58-189619, in which its adjustment data memory means is constituted by a PROM (programmable read only memory).

Some photographic operating devices in a photographic camera such as a diaphragm aperture or a shutter carrying out mechanical operations have functional characteristics thereof varied with extended use of the camera. In order to permit the adjustment means to constantly carry out over a long time proper adjustment for such photographic operating devices subjected to the changes in their characteristics with passage of time, it is necessary to appropriately change the adjustment data to be stored in the memory means.

However, in the case of the conventional memory means constituted by a PROM, inconveniently enough, the means need be connected to a PROM writer in order to rewrite the data stored therein. Especially if the memory means is disposed at an inaccessible place inside the camera as in many cases, the camera need be taken apart for the data rewriting operation.

Moreover, in the conventional camera of this type, the adjustment means has a rather complicated construction, which tends to result in a high construction cost. Also, the adjustment data are obtained through troublesome and time-consuming manual trial-and-error operations.

SUMMARY OF THE INVENTION

Therefore, it is a primary object of the present invention to provide a photographic camera having memory means in which adjustment data for respective photographic operating devices may be readily rewritten and having more reliable adjustment means in combination thereby overcoming the above-described drawbacks of the conventional camera.

In order to facilitate the adjustment data rewriting operation, according to the present invention, the memory means is preferably constituted by an EEPROM (electrically erasable and programmable ROM).

The EEPROM is advantageous in that erasing operation of stored contents and writing operation of new information may be readily carried out by providing a pulse current without using any special devices.

Therefore, even if this EEPROM is disposed in a hardly-accessible place inside the camera, the adjustment data for the photographic operating devices may be very easily stored therein, for example, by electrically connecting a measuring device for measuring the functional characteristics of the photographic operating devices to input terminals of the EEPROM.

Also, with the use of the EEPROM, it is readily possible to rewrite the adjustment data. Such data rewriting operation may be conveniently carried out not only at the time of shipping from the factory but also whenever adjusted data are needed for adjusting errors occurring with an extended use of the camera.

A photographic camera according to one preferred embodiment of the present invention comprises light measuring means including a light measuring circuit for outputting analog information corresponding to brightness of an object to be photographed and an A/D converter for converting the analog information into digital information, an adjustment data memory for storing digital adjustment data for adjustment of the A/D converted object brightness information and adjustment means for providing adjusted object brightness data from the A/D converted object brightness and from the adjustment data read from the adjustment data memory.

When there are no errors by the light measuring circuit and the A/D converter under a known object brightness condition, object brightness information obtained as output characteristics from the A/D converter may be obtained as a design value, e.g. through a calculation.

Thus, if the output characteristics as a design value are used as a reference characteristics, the output characteristics from the A/D converter are measured for each camera, adjustment data based on a difference between the output characteristics and the reference characteristics is stored in the memory means, and if the object brightness information is adjusted by using the adjustment data stored in the memory means, it is possible to eliminate the errors of the light measuring circuit and the A/D converter.

Accordingly, as in this embodiment, if the adjustment data are pre-stored in the memory means provided in the camera and if the adjustment operations are carried out in photographing by the adjustment means using the above pre-stored adjustment data, special adjustment circuits using a variable resistor or the like and required in the prior art as will be more particularly described later are not necessary and also the troublesome and time-consuming manual operations for the adjustment are not necessary either.

Furthermore, in the above construction, the difference between the output characteristics including the errors of both the light measuring circuit and the A/D converter and the reference characteristics is obtained, the adjustment data for the functional errors of both of the circuit and the converter may be obtained at one time.

Further, if the adjustment data are derived from a linear function expression established between a design value and an actual value, the above-described trial-and-error operations are not necessary either.

Of course, the preferable use of the EEPROM as the memory means provides the above-described advantages.

According to another preferred embodiment of the present invention, there is provided a photographic camera system having light emission control means for adjusting a flash light emission amount. This photographic camera system comprises an electronic flash device, a film speed memory for storing film speed information from a film, an adjustment data memory for storing digital adjustment data for the adjustment of the light emission control and adjustment means for obtaining an adjusted film speed value from the film speed the adjustment data, the light emission control means including light receiving means for receiving light reflected from an object to be photographed and then for generating an electric signal corresponding an amount of light incident thereto, a D/A converter for converting the adjusted film speed value provided by the adjustment means into an analog signal and a light emission control circuit for generating a light emission stop signal to the electronic flash device when it is detected based on the electric signal from the light receiving means and on the analog signal from the D/A converter that an amount of light reflected from the object has reached a predetermined value.

In this embodiment too, the same advantages accrue as in the previous embodiment.

That is to say, when there exist no errors by the light receiving means and the D/A converter, the output characteristics of the light emission control circuit, e.g. a duration time period of light emission operation of the electronic flash device which is controlled to provide a constant exposure amount for the film may be obtained as a design value through, e.g. a calculation.

Thus, if the output characteristics as a design value is used as a reference characteristics, the output characteristics from the light emission control circuit is measured for each camera, adjustment data based on a difference between the output characteristics and the reference characteristics is stored in the memory means, and if the output characteristics is adjusted by using the adjustment data stored in the memory means, it is possible to eliminate the errors of the light receiving means and the D/A converter.

Since the D/A converter converts the film speed information stored as digital data into an analog signal and then outputs the same, the above adjustment may be readily carried out by adjusting the digital film speed information to the D/A converter and by partially modifying the conventional construction without providing any special circuit.

And, as described above, as the adjustment data are pre-stored in the memory means provided in the camera and the adjustment operations are carried out in photographing by the adjustment means using the above pre-stored adjustment data, a special adjustment circuit using a variable resistor or the like and required in the prior art is not necessary and also the manual operations for the adjustment are not necessary either.

Furthermore, in the above construction, the difference between the output characteristics including the errors of both the light receiving means and the D/A converter and the reference characteristics is obtained, the adjustment data for the functional errors of both of the means and the converter may be obtained at one time.

Further, if the adjustment data are derived from a linear function expression established between a design value and an actual value, the above-described trial-and-error operations are not necessary either.

Of course, in this embodiment as well, the preferable use of the EEPROM as the memory means provide the above-described advantages.

Other features and advantages of the present invention will become more apparent from the following description of the preferred embodiments with reference to the accompanying drawings.

BRIEF DESCRIPTION OF THE DRAWINGS

Accompanying drawings illustrate preferred embodiments of the present invention; in which, FIGS. 10A, 10B through 23, 24A, 24B, and 25-32 are flow charts illustrating functions of the camera and the testing device shown in FIG. 1.

DESCRIPTION OF THE PREFERRED EMBODIMENTS

Preferred embodiments of the present invention will be particularly described hereinafter with reference to the accompanying drawings.

Figure 1:
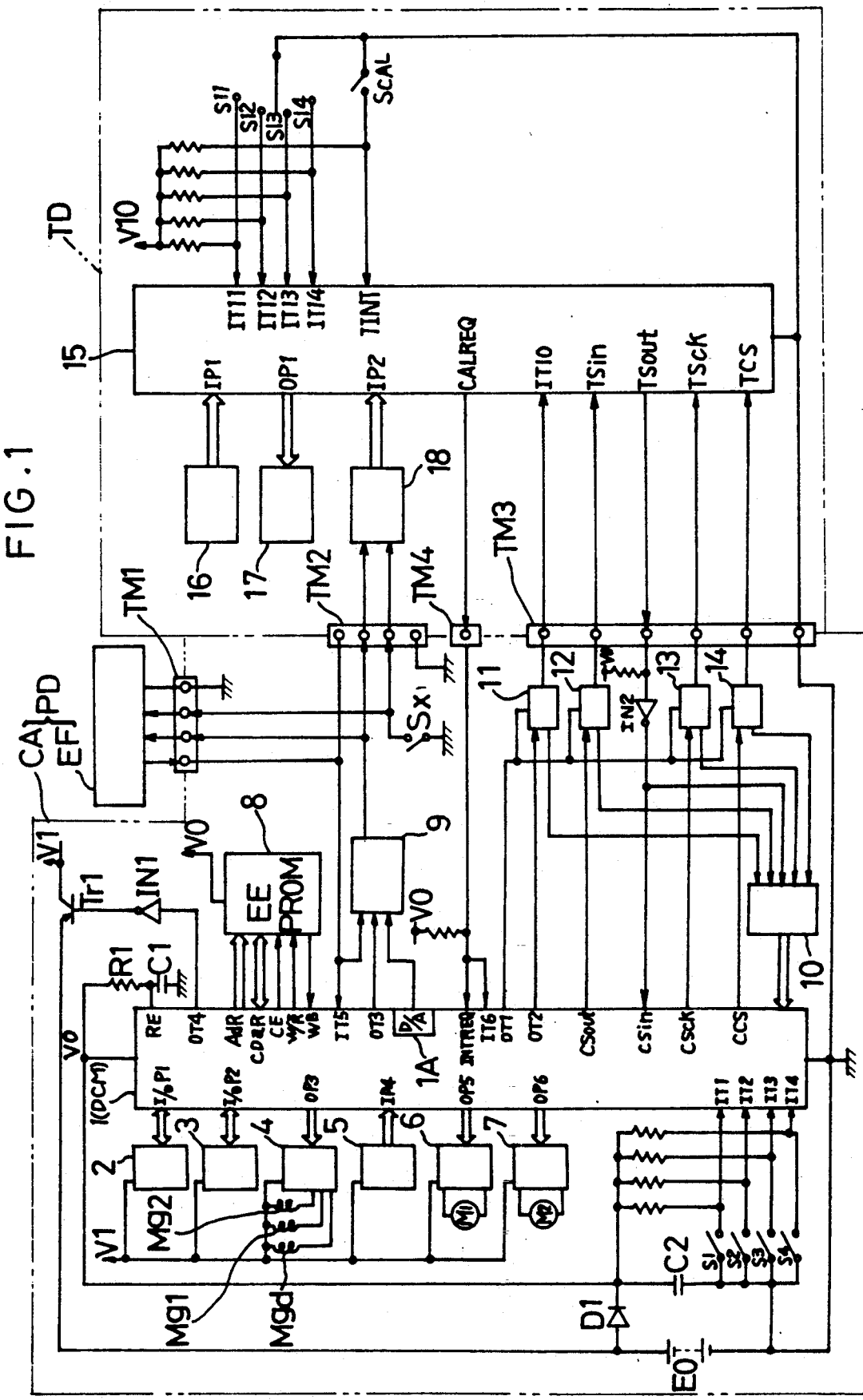
FIG. 1 is a block diagram showing a camera and a testing device related to the present invention.

FIG. 1 is a block diagram showing a camera related to the present invention and constituting a photographic device PD and having a testing device TD attached thereto for testing various functions of this camera CA.

In the same figure, the photgraphic device PD is denoted by a left block and includes the camera CA related to the present invention and an electronic flash device EF to be mounted on a hot shoe of this camera CA. The testing device TD is denoted by a right block.

The respective blocks will be now particularly described firstly with the photographic device PD.

A reference numeral 1 denotes a camera microcomputer (to be briefly referred to as a camera computer hereinafter) for carrying out sequential control operations of the whole camera system, various calculations and control operations of various circuits to be described later.

A reference numeral 2 denotes a focus detecting circuit. This focus detecting circuit starts an integrating calculation by a built-in CCD type line sensor (not shown) in response to a focus detection start signal from an input-output port I/O P1 of the camera computer 1, and then after the above integrating calculation is completed, the focus detecting circuit converts analog integration data obtained by the line sensor into an 8-bit digital signal and outputs the same to the input-output port I/O P1 of the camera computer 1.

A reference numeral 3 denotes a light measuring circuit including a spot light measuring section and an average light measuring section having different light receiving areas. In operation, this light measuring circuit 3 starts , by either of the light measuring sections, measuring light having passed a photographic lens (not shown) in response to a light measurement start signal from an input-output port I/O P2 of the camera computer 1, and then digitizes the measured result at an A/D convertor section and outputs the digital data as a brightness value BVo in the APEX system to the input-output port I/O P2 of the camera computer 1. The construction and functions of this light measuring circuit 3 will be more particularly described later.

A reference numeral 4 denotes an exposure control circuit. In operation, this exposure control circuit 4, based on an exposure control signal from an output port OP3 of the camera computer 1, controls operations of a magnet Mgd for controlling the step-down of a diaphragm aperture, a magnet Mg1 for controlling the travel of a leading curtain (first curtain) of a focal plane shutter and a magnet Mg2 for controlling the travel of a trailing curtain (second curtain) of the shutter, thereby controlling exposure determined by a combination of an aperture and a shutter speed.

A reference numeral 5 denotes a lens circuit incorporated in the photographic lens (not shown) which is exchangeable relative to the camera body. In this lens circuit 5, there are stored such lens information particular to the employed photographic lens as focal length information, full open aperture information or a conversion factor of a lens driving amount relative to a defocusing amount. In operation, this lens circuit 5 converts the above lens information into predetermined electric signals and then outputs the same to an input port IP4 of the camera computer 1.

A reference numeral 6 denotes a film winding-up circuit. In operation, this film winding-up circuit 6, based on a film winding-up signal from an output port OP5 of the camera computer 1, controls operations of a film winding-up motor M1 so as to wind-up a film by one frame length.

A reference numeral 7 denotes a lens driving circuit. In operation, this lens driving circuit 7, based on a lens driving control signal from an output port OP6 of the camera computer 1, controls a lens driving motor M2 so as to drive a movable section inside the photographic lens by a desired amount corresponding to the defocusing amount.

A reference numeral 8 denotes an electrically erasable and rewritable memory device (will be briefly referred to as EEPROM hereinafater) for storing adjustment data to be utilized by the camera computer 1 for various adjustment calculations to be described later. This EEPROM 8, which is an example of memory means, integrally includes a booster circuit for erasing and rewriting data. In operation, the EEPROM 8 , for data rewriting, carries out voltage boosting operations for obtaining a boosted voltage required for data erasing and rewriting and then rewrites the input data into a designated address.

A reference mark EF denotes an electronic flash device to be attached to or to be also integrated in the camera CA.

A reference numeral 9 denotes a light emission control circuit. In operation, this light emission control circuit 9 detects an amount of light emitted from the electronic flash device EF and then reflected by an object to be photographed, and then outputs a flash light emission stop signal to the electronic flash device EF when the detected light amount has reached a predetermined value. The construction and functions of this light controlling circuit 9 will be more particularly described later.

A reference numeral 10 denotes a decoder circuit. In operation, this decoder circuit 10 electronically decodes a film data code (to be briefly referred to as a DX code hereinafter) formed in an outer periphery of a film cartridge by a combination of an electrically conductive portion and an electrically non-conductive portion, and then outputs a film speed information as an APEX film speed value SV by means of a digital signal to an input port IP7 of the camera computer 1.

Figure 2:
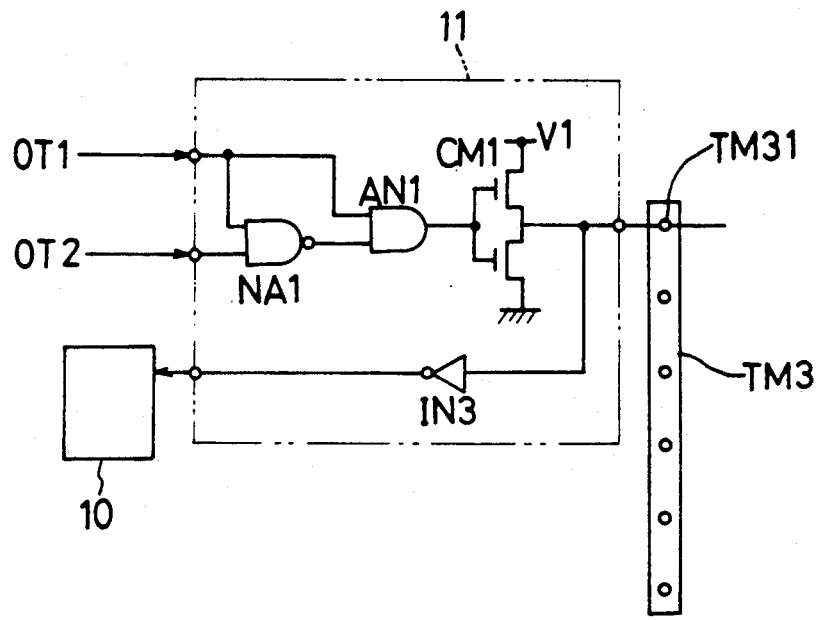
FIG. 2 is a circuit diagram showing input and output circuit shown in FIG. 1.

Reference numerals 11 through 14 respectively denote input-output switching circuits. Since these input-output switching circuits are identical to each other in construction and functions, only one of them is shown in FIG. 2.

Output from an output terminal OT1 of the camera computer 1 is in the state of 'H' (high) in an adjustment mode for adjusting the functions of various components of the camera CA by utilizing the testing 25 device TD whereas the same is in the state of 'L' (low) in a photography mode for carrying out a regular photographic operation.

In the photography mode, an AND gate AN1 outputs an 'L' signal, whereby a C-MOS gate CM1 acts as a pull-up resistor having a high resistance value. Therefore, signals to be input to a group of terminals TM3 are inverted by an invertor IN3 and then input to the decoder circuit 10.

In the adjustment mode, on the other hand, both of the AND gate AN1 and a NAND gate NA1 becomes active whereby signal from an output terminal OT2 of the camera computer 1 is inverted through the NAND gate NA1 and is output through the AND gate AN1. This signal is again inverted through the C-MOS gate CM1 and is output, externally of the system, through the group of terminals TM3 as signal in the same state as the output signal from the output terminal OT2.

A reference mark TM1 denotes a group of terminals provided at the hot shoe and adapted for electrically connecting the camera CA with the electronic flash device EF.

A reference mark TM2 denotes a group of terminals for electrically connecting the camera CA with the testing device TD. By utilizing this group of terminals TM2, it is also possible to connect with the camera CA an electronic flash device different from the above-described electronic flash device EF.

A reference mark TM3 denotes a group of terminals provided inside a film cartridge chamber of the camera CA and adapted for receiving the aforementioned DX code as coming into contact with the same.

A reference mark TM4 denotes a terminal, which is adapted, like the group of terminals TM2, for electrically connecting the camera CM with the testing device TD. For adjusting the various functions of the camera CA, adjustment mode data which are output from the testing device TD for designating which adjustment mode is currently selected are transferred through this terminal TM4. This terminal TM4 is attached externally on the camera body CA; however, the same is covered with a brand plate so as to be normally inaccessible from the outside of the camera CA.

A reference mark EO denotes a power source battery, which supplies through a power supply transistor Tr1 electricity at a voltage V1 to the focus detecting circuit 2, the light measuring circuit 3, the exposure control circuit 4, the lens circuit 5, the film winding-up circuit 6, the lens driving circuit 7, the light emission control circuit 9, the decoder circuit 10 and to the four input-output switching circuits 11 through 14.

Reference marks R1 and C1 respectively denote a reset resistor and a reset capacitor for detecting an attachment of the battery EO. Reference marks D1 and C2 respectively denote an anti-reverse charging diode and a back-up capacitor.

A reference mark S1 denotes a photography preparation switch which is closed when a release button (not shown) is depressed down to its first stroke. With the closure of this photography preparation switch S1, necessary preparatory operations for a photography such as light measuring and focusing are carried out.

A reference mark S2 denotes a release switch which is closed when the release button is depressed further downwards to its second stroke. Upon the closure of this release switch S2, photographic operations such as stop-down of the aperture and travel of the shutter curtain are started.

A reference mark S3 denotes a film winding-up completion switch, which is closed when the film is wound up by one-frame length and which is opened when photographing has been carried out.

A reference mark S4 denotes a light measuring mode select switch, which selects for the light measuring operation which of the average light measuring section or the spot light measuring section is to be used.

A reference mark Sx denotes an X contact which is closed with completion of travel of first curtain and through which a flash light emission start signal is generated to the electronic flash device EF.

Next, respective blocks or sections of the testing device TD will be particularly described.

A reference numeral 15 denotes a testing device microcomputer (to be briefly referred to as a test computer hereinafter) for controlling the respective sections of the testing device TD to be described later, communicating data with the camera computer 1 and carrying out the sequential control in the adjustment operations and so on.

A reference numeral 16 denotes a shutter speed measuring section. In operation, this shutter speed measuring section 16 is attached to a predetermined position of the camera CA with its back lid (not shown) being opened, and measures an actual opening time period of the shutter of the camera CA and then outputs the measured result to an input port IP1 of the test computer 15.

A reference numeral 17 denotes a reference brightness generating section. In operation, this reference brightness generating section 17 constantly emits a light of predetermined brightness in response to a flash light emission control signal output from an output port OP1 of the test computer 15.

A reference numeral 18 denotes a light emission control time measuring section. In operation, this light emission control time measuring section 18 measures a time period after the X contact Sx is closed until the flash light emission stop signal is output to the electronic flash device EF, and then outputs the measured result to an input port IP2 of the test computer 15.

Reference marks S11 through S14 respectively denote adjustment mode select switches. Closures of these switches S11 through S14 are adapted to correspond to a shutter speed adjusting mode, a light measurement adjusting mode, a flash light emission control adjusting mode and to a focus detection adjusting mode, respectively, such that operations in the above respective modes are carried out depending on states of input ports IT11 through IT14 of the test computer 15 to which these switches are respectively connected. The operations in the respective adjusting modes will be more particularly described later.

A reference mark Scal denotes a start switch which is closed in starting an adjustment operation. With the closure of this start switch Scal, an adjustment request signal for starting the adjustment operation is output to the camera computer 1 from an output terminal CAL-REQ of the test computer 15.

Next, a regular photographic operation using the above-described camera CA will be particularly described with reference to a flow chart in FIG. 10.

When the power source battery EO is mounted, input signal to a reset terminal RE of the camera computer 1 is switched from 'L' to 'H', whereby the camera computer 1 executes a routine shown after 'Battery Mounting' in the same chart.

At step #1, the camera computer 1 calls an adjustment data read-out subroutine, reads out the various adjustment data stored in the EEPROM 8 and sets the same in a predetermined registers ReA in the camera computer 1.

Referring to the various adjustment data stored in the EEPROM 8, these data are first calculated in the respective adjustment mode by the testing device TD and then written into the EEPROM 8 and the data actually comprise adjustment values for operational tolerances of the shutter, the light measuring circuit 3, the flash light emission control circuit 9 and the focus detecting circuit 2. Details of these data will be more particularly described later.

Figure 12:
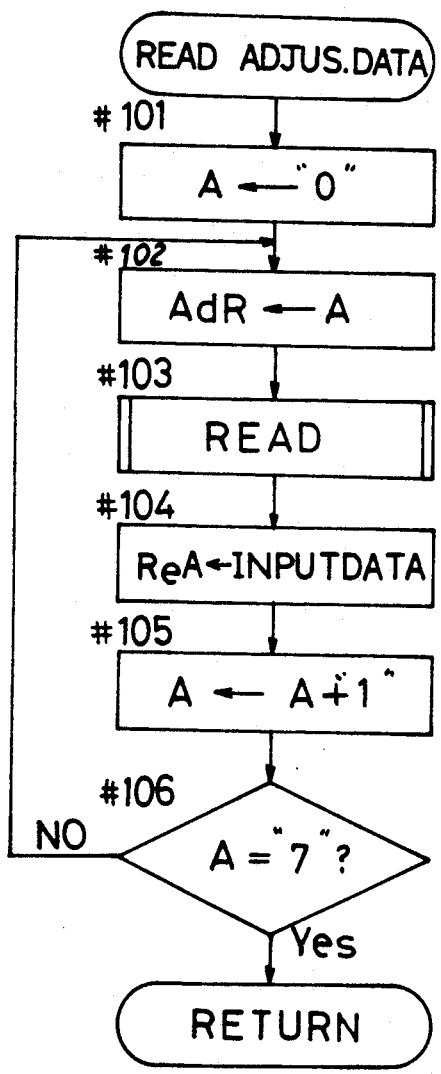

FIG. 12 shows a flow chart of the above adjustment data read-out subroutine.

When this subroutine is called, the camera computer 1 resets a variable 'A' at step #101. At step #102, this variable 'A' is set at an address designating register AdR for designating an address in the EEPROM 8.

Figure 13:
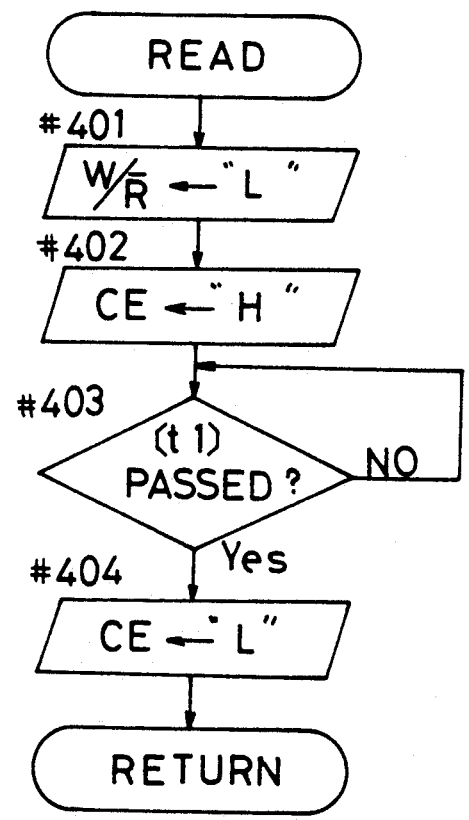

Next, a read subroutine is called and the adjustment data at the designated address is read at step #103. This read subroutine is illustrated in a flow chart in FIG. 13.

When this subroutine is called, the camera computer 1 switches a write-read terminal W/R to 'L' thereby indicating to the EEPROM 8 that the mode is now a data read mode at step #401. Then, the camera computer 1 switches a chip enable terminal CE to 'H' to start reading out the adjustment data from the EEPROM 8 at step #402.

Referring briefly to this reading-out operation, by receiving the 'H' signal from the chip enable terminal CE, the EEPROM 8 latches the contents of the address designating register AdR which are input through an address bus. Then, the adjustment data stored in the designated address are transferred via a data bus to a data read-write register CDaR of the camera computer 1.

Thereafter, at step #403, the camera computer 1 waits for a time lapse t1 needed for reading the adjustment data. After the chip enable terminal CE is switched to 'L' to complete the reading operation at step #404, the process returns to the adjustment data read subroutine.

Referring back to FIG. 12, after the process has returned from the above read subroutine, at step #104 the adjustment data read in this subroutine are stored at a register ReA (e.g. at a register Re0 in the first cycle, at a register Re1 in the second cycle, and so on) corresponding to a value of the variable 'A'.

At step #105, this variable 'A' is incremented and at the next step #106 it is judged whether this variable 'A' is now '7' or not, i.e. whether the operations from step #102 to step #105 have been repeated seven times or not. If it is judged that the variable 'A' is not yet '7', the process returns to step #102 to repeat the above-described flow up to step #105.

The EEPROM 8 includes seven addresses, each address storing therein seven kinds of adjustment data shown in the following Table 1:

TABLE 1

| address in EEPROM 8 | data | register (ReA) in camera computer 1 |
|---|---|---|
| 0 | shutter speed adjustment data(Δts) | Re0 |
| 1 | first light measurement adjustment data (m) | Re1 |
| 2 | second light measurement adjustment data (n1) | Re2 |
| 3 | third light measurement adjustment data (n2) | Re3 |
| 4 | first light emission control adjustment data (i) | Re4 |
| 5 | second light emission control adjustment data (j) | Re5 |
| 6 | focus detection adjustment data(ΔDf) | Re6 |

Details of the respective adjustment data will be described later. In the third column in the above Table 1, there are shown the registers ReA of the camera computer 1.

When the process has repeated the flow after step #102 seven times and if it judged at step #106 that the variable 'A' has become '7', the process judges that all of the necessary adjustment data have been read and then returns to the main routine.

Referring back to FIG. 10A, having returned from the adjustment data read subroutine, at step #2 the camera computer 1 judges from the state of the input terminal IT1 whether the photography preparation switch S1 is closed or not.

If it is judged at this step #2 that the photography preparation switch S1 is not closed, all the output terminals are switched to 'L' at step #3, and the output terminal OT4 is switched to 'L' thereby turning 'OFF' the power supply transistor Tr1 at step #4. Then, the process returns to step #2 and repeats the flow up to step #4 until the photography preparation switch S1 is closed.

On the other hand, if it is judged at step #2 that the photography preparation switch S1 is closed, the process goes on to step #11 to switch the output terminal OT4 to 'H', whereby the power supply transistor Tr1 is turned 'ON' to start supplying power to the respective circuits.

At step #12, a light measurement start signal is output to the light measuring circuit 3 to start a light measuring operation. At step #13, the lens information such as the full open aperture value AVo of the photographic lens and the conversion factor 'K' for converting a defocusing amount into a lens drive amount are input from the lens circuit 5. Then, at step #14, it is judged from the state of an input terminal IT6 whether or not the adjustment mode data have been input from the testing device TD, i.e. whether or not any one of the adjustment modes has been selected in the testing device TD.

If it is judged at this step #14 that any one of the adjustment modes has been selected since the input terminal IT5 is in the state of 'L', the process goes on to an adjustment operation 'C' routine after step #51 shown in FIG. 11. This routine will be particularly described later. On the other hand, if it is judged at step #14 that no adjustment mode has been selected, the process goes on to step #15 to call a focus detection subroutine. This subroutine is illustrated by a flow chart in FIG. 14.

When this focus detection subroutine is called, the camera computer 1 generates a focus detection start signal to the focus detecting circuit 2 at step #111, whereby the CCD line sensor in the focus detecting circuit 2 starts a charge accumulation. The process waits for the completion of this charge accumulation by the line sensor in the focus detecting circuit 2 at step #112.

When the camera computer 1 receives from the focus detecting circuit 2 a signal indicating the completion of the charge accumulation, the camera computer 1 inputs digitized accumulated data from the focus detecting circuit 2 at step #113, and then by calculating a defocusing amount based on the above data, the camera computer 1 derives a defocusing amount Df at step #114.

When the process returns from the above-described focus detecting subroutine, a focus detection adjustment subroutine is called at step #16. In this subroutine, based on the focus detection adjustment data read from the EEPROM 8 at step #1, a predetermined adjustment calculation is carried out to obtain an adjusted defocusing amount Df'. This focus detection adjustment subroutine will be more particularly described later.

At step #17, based on the above adjusted defocusing amount Df' and also on the conversion factor 'K' read from the lens circuit 5 at step #13, a lens drive amount Np is derived from the following expression:

$$Np = Df' \times K \tag{1}$$

At step #18, a lens drive control signal based on this lens drive amount Np is output to the lens drive circuit 7.

At step #19, it is judged from the state of the input terminal IT4 which of the light measurement modes has been selected. If it is judged at this step #19 that the average light measurement mode has been selected, a control signal for switching a light measurement section select switch to be described later to the average light measurement section is output to the light measuring circuit 3 at step #20. On the other hand, if it is judged that the spot light measuring mode has been selected, a control signal for switching the light measurement section select switch to the spot light measurement section is output to the light measurement circuit 3 at step #21. At the next step #22, a brightness value BVo of the object to be photographed, which has been digitized and detected by the light receiving element in the selected light measurement section after passing the photographic lens, is input.

At step #23, a light measurement adjustment subroutine is called. In this subroutine, based on the light measurement adjustment data read from the EEPROM 8 at step #1, a predetermined adjustment calculation is carried out to obtain an adjusted brightness value BVo'. This light measurement adjustment subroutine will be more particularly described later.

At step #24, the film speed value SV is input which is output as a digital signal from the decoder circuit 10 as the group of terminals TM3 come into contact with the DX code on the film cartridge. At step #25, an exposure value EV is derived from the following expression:

$$EV = BVo' + SV + AVo \qquad (2)$$

Thereafter, at step #26, it is judged from the state of the input terminal IT5 whether or not an 'H' charging completion signal has been input from the electronic flash device EF.

If it is judged at this step #26 that the charging completion signal has not yet been input, at step #27, an exposure time value TV and an aperture value AV are derived from a predetermined exposure calculating expression based on the exposure value EV obtained at step #25. At step #28, a flash flag FLF indicating a flash photography is reset, and then the process goes on to step #32.

On the other hand, if it is judged at step #26 that the charging completion signal has been input, the exposure time value TV is set as '6' corresponding to a synchronizing speed of 1/60, and then at step #29, based on this exposure time value TV and the exposure value EV obtained at step #25, an aperture value AV is derived from a predetermined exposure calculating expression at step #29.

At the next step #30, a light emission control adjustment subroutine is called. In this subroutine, based on the light emission control adjustment data read from the EEPROM 8 at step #1, a predetermined adjustment calculation is carried out to obtain an adjusted film speed value SV' which is converted into analog data to be output to the light emission control circuit 9. This light emission control adjustment subroutine will be more particularly described later. At step #31, the flash flag FLF is set, and then the process goes on to step #32.

At this step #32, a shutter speed adjustment subroutine is called. In this subroutine, based on the shutter adjustment data read from the EEPROM 8 at step #1, a predetermined adjustment calculation is carried out to obtain an adjusted exposure time value TV'. This shutter speed adjustment subroutine will be more particularly described later.

The above operation from step #11 to step #32 together constitute the photography preparatory operations.

At step #33, it is judged from the state of the input terminal IT2 whether or not the release switch S2 is closed. If it is judged at this step #33 that the release switch S2 is not closed, the process returns to step #2. On the other hand, if it is judged at this step #33 that the release switch S2 is closed, the process enters the photography operation flow after step #34.

First, at step #34, it is judged whether or not the flash flag FLF for indicating a flash photography mode is set. If it is judged at this step #34 that the flash flag FLF is set, a flash photography subroutine is called at step #35. On the other hand, if it is judged that the flash flag FLF is reset, the process skips over step #35 to go on to step #36.

Figure 15:
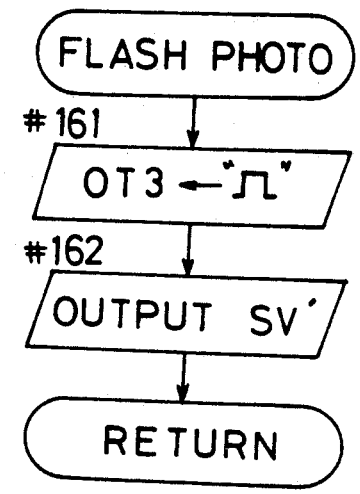

The above flash photography subroutine called at step #35 is illustrated by a flow chart in FIG. 15.

When this subroutine is called, first at step #161, the camera computer 1 switches the output terminal OT3 to 'H' in a short duration to indicate the flash photography mode. At step #162, the adjusted film speed value SV' obtained in the light emission control adjustment subroutine called at step #30 is converted into an analog signal to be output to the light emission control circuit 9, and then the process returns to the main routine to proceed to step #36.

At this step #36, an exposure control subroutine is called. This subroutine is illustrated by a flow chart in FIG. 16.

When this exposure control subroutine is called, the exposure time value TV obtained at step #27 or at step #29 is converted into an actual shutter opening time ts by the following expression (3):

$$ts = 2^{-TV} \qquad (3)$$

At step #172, a release start signal is output to the exposure control circuit 4, whereby a mirror-up operation and an aperture stop-down operation are started.

At step #173, based on the aperture value AV obtained at step #27 or at step #29, an aperture control operation is carried out, and when an aperture opening amount has reached a value equivalent to this aperture value AV, a control signal for energizing the aperture magnet Mgd is generated to the exposure control circuit 4 for the termination of the aperture control.

With a completion of the aperture control operation and also with a completion of the mirror up operation, at step #174, a control signal for deenergizing the magnet Mg1 for the first curtain of the focal plane shutter is output to the exposure control circuit 4 thereby starting travels of the first curtain. With this start of the first curtain, a time measuring operation is started. At step #175, the process waits for a lapse of the actual shutter opening time ts obtained at step #171, and then a control signal for deenergizing the magnet Mg2 for the second curtain of the shutter is output to the exposure control circuit 4 thereby starting travels of the second curtain.

The above completes the exposure operation. Then, the process returns to the main routine.

Figure 17:
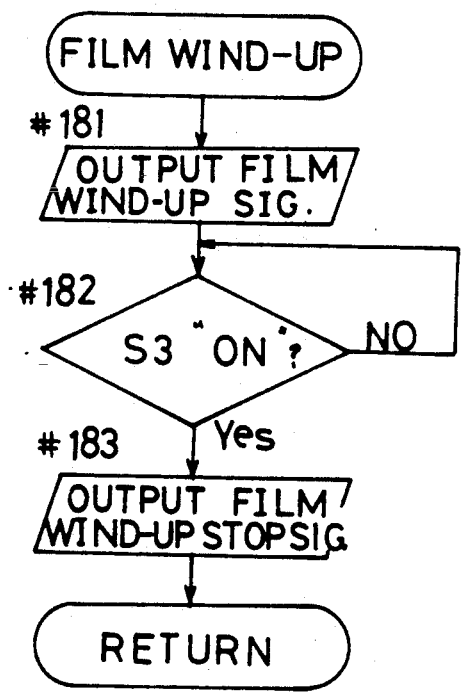

Referring back to FIG. 10B, after returning from the above exposure control subroutine, the process calls a film winding-up subroutine at step #37. This subroutine is illustrated by a flow chart in FIG. 17.

When this film winding-up subroutine is called, at step #181, a film winding-up signal is output to the film winding-up circuit 6 for winding up the film by one frame length. At step #182, watching the state of the input terminal IT3, the process waits for the winding-up completion switch S3 to be closed with the film having been wound up by one frame length.

If it is judged the one-frame film winding-up operation has been completed since the winding-up completion switch S3 is now closed, a winding-up stop signal is output to the film winding-up circuit 6 at step #183, and then the process returns to the main routine.

Referring again to FIG. 10A, after returning from the above-described film winding-up subroutine, the process returns to step #2. Thereafter, the above operations are repeated.

The above operations together constitute the regular photography operation, i.e. the photography mode operations of the camera.

Next, operations in the adjustment mode will be particularly described.

By closing the start switch Scal of the testing device TD with the testing device TD attached to the camera body CA, the mode is switched to the adjustment mode for carrying out various adjustment operations of the respective sections of the camera CA.

With the closure of the start switch Scal, there occurs a rise in an input to an interruption input terminal TINT of the test computer 15, whereby the test computer 15 starts executing a routine of the adjustment operation 'T' This routine will be more particularly described later.

In this routine, the test computer 15 outputs through its output terminal CALREQ an 20 adjustment request signal which falls from 'H' to 'L' This adjustment request signal is transferred via a terminal TM4 to the camera computer 1. Receiving this signal through its interruption input terminal INTREQ, the camera computer 1 carries out an interruption, and then executes a routine after a reference mark INTREQ in the flow chart in FIG. 10A.

From steps #11 through #13, there are executed the same operations as in the photography mode. At step #14, it is judged from the 'L' state of the input terminal IT6 that the mode is now in the adjustment mode, and the process carries out an adjustment operation 'C' subroutine shown in FIG. 11.

Figure 18:
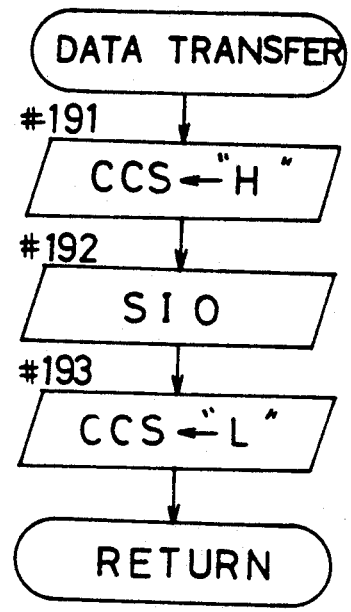

In this subroutine, at step #51, the camera computer 1 switches the output terminal OT1 to 'H' to permit the respective input-output switching circuits 11 through 14 to act as output circuits. Then, at step #52, a data transfer subroutine is called. This subroutine is illustrated by a flow chart shown in FIG. 18.

When this subroutine is called, at step #191, the camera computer 1 switches the chip select terminal CCS to 'H' to indicate to the test computer 15 that a serial data transfer is to be carried out. Thereafter, at step #192, the serial data transfer is carried out from the test computer 15 to the camera computer 1.

This serial data transfer is started with Osct of eight clock pulses from an output terminal CSck of the camera computer 1. Then, synchronized with rises of the respective clock pulses, the data is output from the data output terminal TSout of the test computer 15. This data is input to a data input terminal CSin of the camera computer 1. Then, the camera computer 1 latches the data input in synchronization with the rise of the respective clock pulses. When this operation is repeated eight times, i.e. for the eight pulses, the one-byte data transfer is completed.

The serial data transfer operation at step #52 is designed for transferring to the camera computer 1 the data about which of the adjustment modes has been selected by the adjustment mode select switches S11 through S14. Also, a data transfer operation from the camera computer 1 to the test computer 15 is carried out in the same manner. In this case, synchronized with rises of the respective clock pulses, data is output from the data output terminal CSout of the camera computer 1 and the test computer 15 latches the data input through its data input terminal TSin in synchronization with falls of the respective clock pulses.

Referring back to FIG. 18, when the serial data transfer is completed at step #192, in order to indicate this completion to the test computer 15, the chip select terminal CCS is switched to 'L' at step #193, and then the process returns to the main routine.

Referring again to FIG. 11, after the process returns from the data transfer subroutine called at step #52, at steps #53 through #59, it is judged based on the data input in this subroutine which adjustment mode has been selected, and based on the result of this judgment, one of subroutines of a shutter speed adjustment 'C', a light measurement adjustment 'C', a light emission control adjustment 'C' and of a focus t detection adjustment 'C' is called.

Having returned after carrying out predetermined adjustment operations to be respectively described later in one of the above adjustment subroutines, the process goes back to step #2, and then waits for an interruption.

Figure 19:
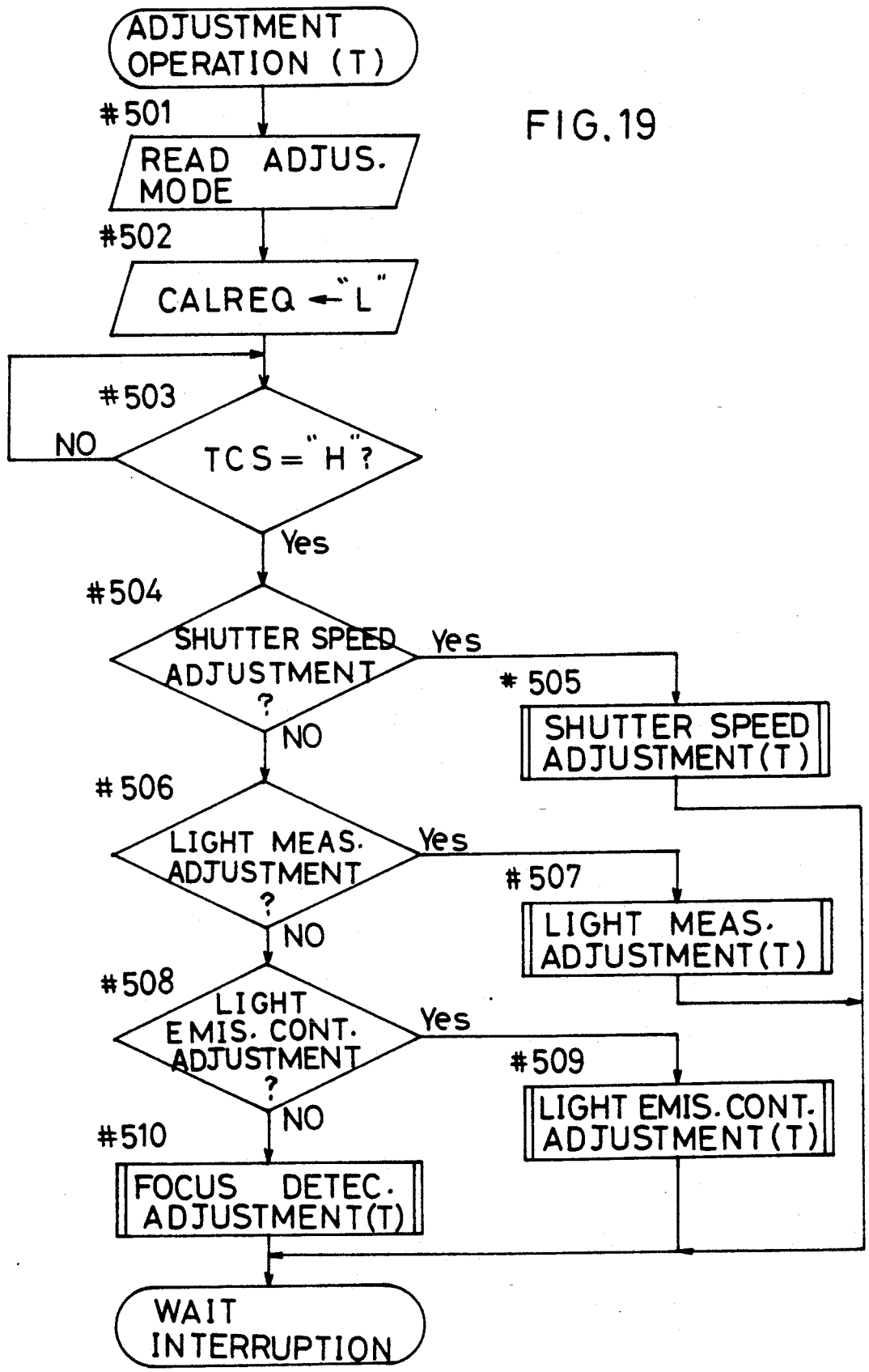

In accordance with the above operations in the adjustment operation 'C' subroutine by the camera computer 1, the test computer 15 of the testing device shown in FIG. 19.

This subroutine is started when the start switch Scal is closed and the input signal to the interruption input terminal TINT of the test computer 15 falls from 'H' to 'L' and there occurs an interruption.

In this routine, at step #501, the test computer 15 judges from the states of the input terminals IT11 through IT14 which of the mode select switches S11 through S14 respectively corresponding to the adjustment modes has been closed.

At step #502, the output signal from an output al CALREQ is switched to 'L' in order to indicate the start of the adjustment operation to the camera computer 1. At the next step #503, watching the state of the chip select terminal TCS, the process waits for the output from the chip select terminal CCS of the camera computer to rise from 'L' to 'H'.

After the serial data transfer is started at step #52 and the output from the chip select terminal CCS of the camera computer 1 rises and the output from the chip select terminal TCS of the test computer 15 rises, at steps #504 through #510, it is judged, from the states of the mode select switches S11 through S14 which have been read at step #501, which adjustment mode has been selected. And, based on the result of this judgment, one of subroutines of a shutter speed adjustment 'T', a light measurement adjustment 'T', a light emission control adjustment 'T' or of a focus detection adjustment 'T' is called.

Having returned after carrying out predetermined adjustment operations in any of the above subroutines, the process waits for an interruption.

Although this will be more particularly described later, in any of the above subroutines, adjustment mode data for indicating the kind of the selected adjustment mode is set at a data transfer register TSIOR. And, the adjustment mode data set at this data transfer register TSIOR is serially transferred to the camera computer 1 at step #52. This adjustment mode data enables the camera computer 1 to judge the kind of the selected adjustment mode.

Next, principles of adjustment, operations of the photographic device PD and the testing device TD and so on in each of the adjustment modes will be particularly described.

(I) shutter speed adjustment

(i) principle of adjustment

Figure 3:
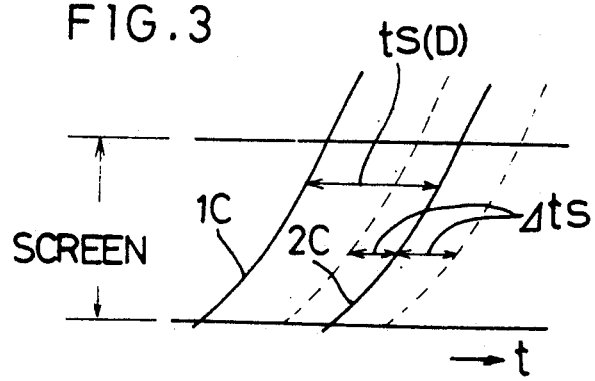
FIG. 3 is a schematic view illustrating operation of a focal plane shutter with passage of time.

FIG. 3 illustrates errors in opening time of the focal plane shutter.

In this FIG. 3, a horizontal axis denotes time 't' and a vertical axis denotes a travelling distance in a curtain travel direction on a screen.

Also, a reference mark ts (b) denotes an ideal actual shutter opening time. However, depending on each camera, because of functional errors of magnets or the like, the first curtain 1c and the second curtain 2c of the shutter are started at slightly different timings. Thus, there occurs a difference of ts relative to the first curtain 1c. This difference ts adversely affects exposure in photography.

This difference $\Delta$ ts will be more particularly described with reference to FIG. 4. In the same figure, a horizontal axis denotes an exposure time value TV calculated by the APEX system while a vertical axis denotes the actual shutter opening time ts.

Figure 4:
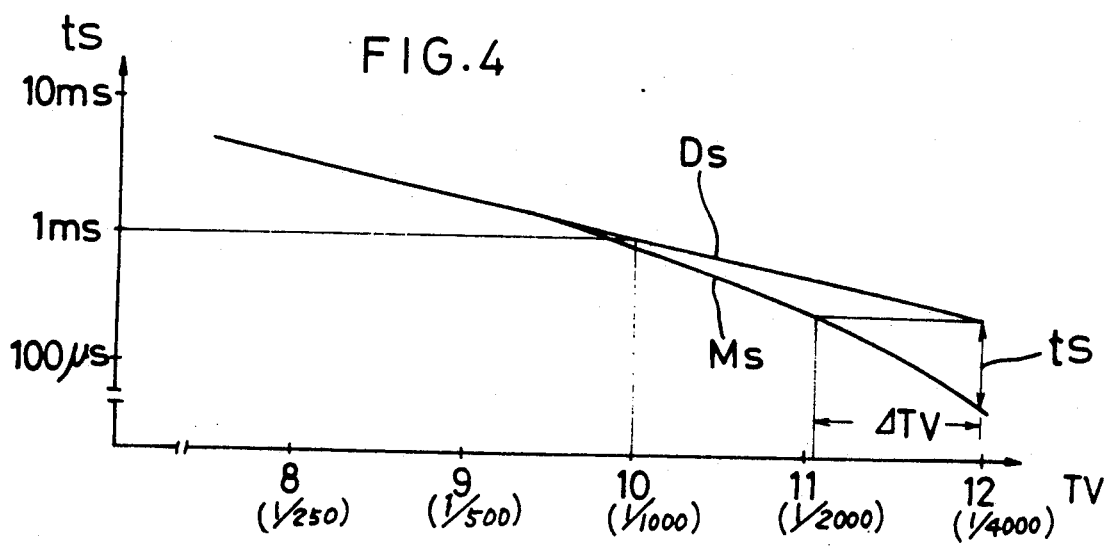
FIG. 4 is a graph illustrating relationship between focal exposure time values and actual shutter opening time values.

Further in this FIG. 4, a line Ds shows an ideal relation between the exposure time value TV and the actual shutter opening time ts.

On the other hand, a line Ms shows an actual relation between the same including the aforementioned difference $\Delta$ts.

As shown in this FIG. 4, the actual time of the difference $\Delta$ts is constant and the difference affects more adversely the exposure with an increase in the shutter speed. Therefore, by adjusting this difference at the fastest shutter speed, it becomes possible to minimize the difference $\Delta$ts at a slower shutter speed as well.

Next, the adjustment calculation for this difference will be described.

The exposure time value TV in the APEX system and the actual shutter opening time ts based thereon have a relationship expressed by the following equation (3):

$$ts = 2^{-TV} \quad (3)$$

Therefore, if the actual opening time ts has the difference of $\Delta$ts, the relationship will now be expressed as:

$$ts + \Delta ts = 2^{-(TV + \Delta TV)} \quad (4)$$

An adjustment value $\Delta TV$ for adjusting the exposure time TV derived from the above equation (4) to the ideal actual opening time ts (D) is obtained from the following equation (5):

$$\Delta TV = \log_2 (1 + \Delta ts \times 2) \quad (5)$$

In the adjustment operation to be described next, the testing device TD measures several times the difference $\Delta$ts between the actual opening time ts at the fastest shutter speed and the ideal actual opening time ts (p). This difference ts has a positive or a negative value depending on the camera. Then, an average value $\Delta$ts the differences obtained in the measurements is written as shutter speed adjustment data into the EEPROM 8 of the camera CA.

In an actual photographing operation, the camera computer 1 reads out this shutter speed adjustment data $\Delta$ts and derives the adjustment value $\Delta TV$ from the above equation (5). Then, by using this adjustment value TV, the calculated exposure time TV is adjusted to obtain an adjusted exposure time value TV', whereby an ideal actual shutter opening time ts(D) substantially corresponding to the intended exposure time value TV may be obtained.

(ii) adjustment operations

Figure 20:
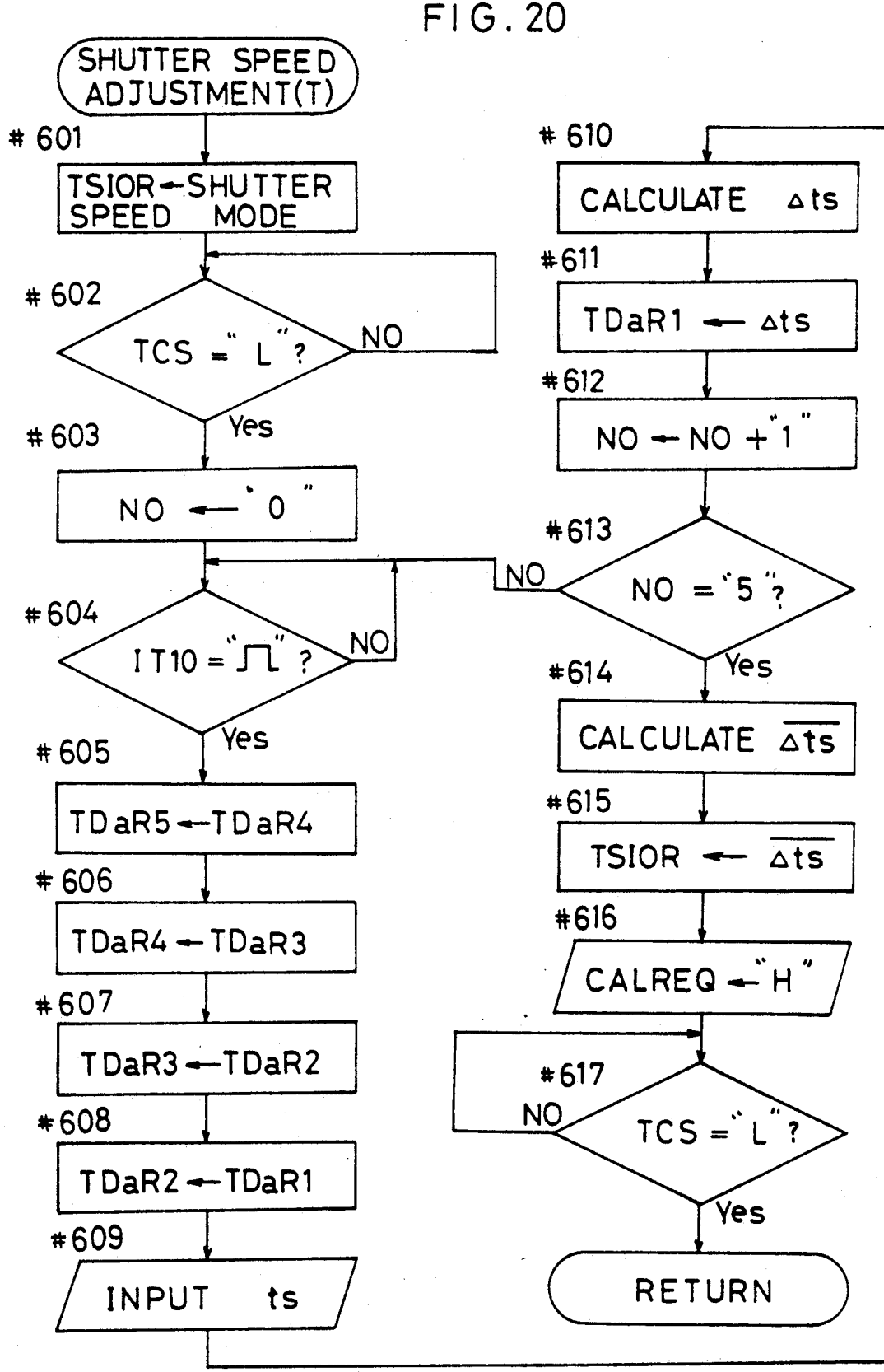

FIG. 20 shows a flow chart of a shutter speed adjustment 'T' subroutine of the test computer 15. This subroutine is called at step #505 in the adjustment operation 'T' routine shown in FIG. 19.

When this subroutine is called, at step #601, the test computer 15 sets at a data transfer register TSIOR adjustment mode data indicating the shutter speed adjustment mode. At step #602, watching the state of the chip select terminal TCS, the process waits for the output of the chip select terminal CCS of the camera computer 1 to fall from 'H' to 'L'.

When the output of the chip select terminal CCS of the camera computer 1 is switched to 'L' at step #54 and then the chip select terminal TCS of the test computer falls to 'L' in accordance therewith, it is judged that the transfer of the adjustment mode data has been completed, and then the process goes on to step #603. At this step #603, a variable NO is reset. Then, at step #604, the process waits until a test data read signal for reading the tested data of the actual shutter opening time is input from the camera computer 1 to an input terminal IT10.

Figure 21:
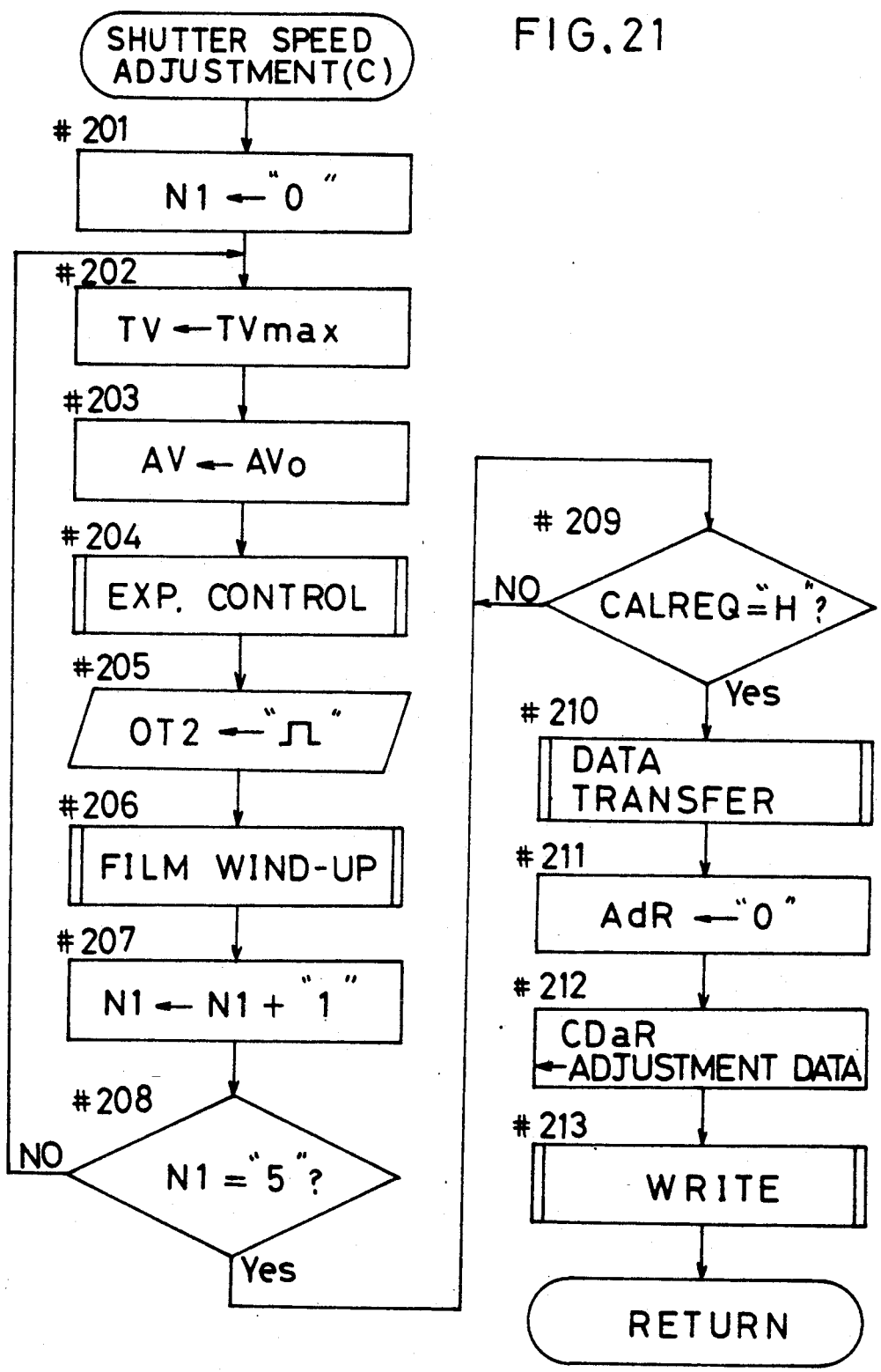

On the other hand, the camera computer 1 receives the above-described adjustment mode data by the serial data transfer at step #52. Then, depending on the judgment at step #53, the process goes on to step #54 to call the shutter speed adjustment 'C' subroutine. This subroutine is illustrated by a flow chart in FIG. 21.

Figure 16:
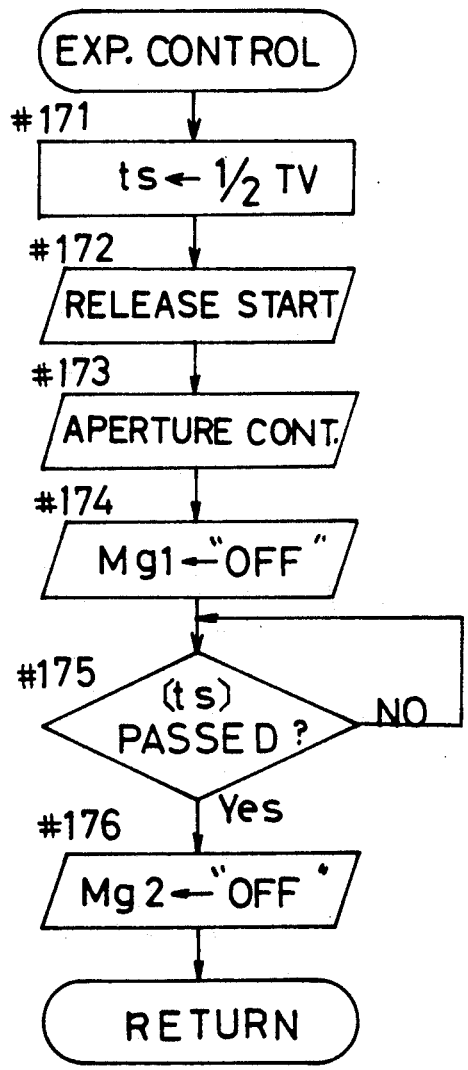

When this shutter speed adjustment 'C' subroutine is called, at step #201, the camera computer 1 resets a variable N1. At the next step #202, the exposure time value TV is set as a maximum exposure time value TVmax corresponding to the fastest shutter speed of the camera CA. At step #203, the aperture value AV is set as an open aperture value AVo. Then, at step #204, the aforementioned exposure control subroutine shown in FIG. 16 is called to carry out an exposure. At step #205, a test data read signal in the form of pulse is output from the output terminal OT2 to the input terminal IT10 of the test computer 15. Thereafter, at step #206, the film winding-up subroutine is called to wind up the film by one frame length.

At step #207, the variable N1 is incremented. At step #208, it is judged whether or not this variable N1 has become '5', i.e. whether or not the operations from steps #202 through step #207 have been carried out five times.

If it is judged that the variable N1 is not yet '5', i.e. the above operations have not yet been carried out five times, the process returns to step #202 to repeat the operations.

On the other hand, if it is judged that the variable N1 has become '5', i.e. the operations have been already carried out five times, the process goes on to step #209.

That is to say, the shutter operation has been carried out five times at this stage.

The test computer 15 is waiting for the input of the test data read signal at step #604. And, when this test data read signal is input from the camera computer 1, the process goes on to step #605.

At steps #605 through #608, data rotations from lower bits to upper bits are carried out between built-in five data registers TDaR1 through TDaR5.

At step #609, the actual opening time ts is input from the shutter speed measuring section 16. This actual shutter opening time ts is obtained by measuring the shutter actuated in the exposure control subroutine called at step #204 by the shutter speed measuring section 16.

At step #610, a difference $\Delta ts$ relative to the aforementioned ideal actual opening time ts ($p$) corresponding to the fastest shutter speed is obtained and then the same is stored at the least significant bit data register TDaR1 at step #611.

At step #612, the variable NO is incremented. At step #613, it is judged whether or not the variable NO has become '5', i.e. whether or not the operations from step #604 to step #612 have been repeated five times.

If it is judged that the variable is not yet '5', i.e. the above operations have not yet been carried out five times, the process returns to step #604 to repeat the operations.

On the other hand, if it is judged that the variable N0 has become '5', i.e. that the above operations have been already carried out five times, the process goes on to step #614.

That is to say, in accordance with the five-time shutter operations, the actual opening time ts is measured five times and differences $\Delta ts1$ through $\Delta ts5$ between the measured actual shutter opening times ts and the ideal actual opening time ts (D) are stored in order into the five registers TDaR5 through TDaR1 respectively.

At step #614, an average value $\overline{\Delta ts}$ of these differences $\overline{\Delta ts1}$ through $\Delta ts5$ is obtained by the following expression:

$$\overline{\Delta ts} = (\Delta ts1 + \Delta ts2 + \Delta ts3 + \Delta ts4 + ts5)/5$$

At step #615, this average value $\overline{\Delta ts}$, which is used as the shutter speed adjustment data, is set at the data transfer register TSIOR. At the next step #616, the output of the output terminal CALREQ is switched to 'H' in order to indicate to the camera computer 1 that the calculation of the shutter speed adjustment data has been completed.

After the five-time shutter operations, the camera computer 1 waits for the output of the output terminal CALREQ of the test computer 15 to be switched to 'H' as watching the state of the input terminal IT6 at step #209.

With the execution of step #616, the input to the input terminal IT6 of the camera computer 1 is switched to 'H', then the process goes on to step #210. At this step #210, the above-described data transfer subroutine is called to carry out a serial data transfer operation, whereby the shutter speed adjustment data $\overline{\Delta ts}$ set at the data transfer register TSIOR of the test computer 15 is transferred to the camera computer 1.

After switching the output of the output terminal CALREQ to 'H' at step #616, at step #617, the test computer 15 waits for the output of the chip select terminal CCS of the camera computer 1, which indicates the completion of the serial data transfer operation, to fall as watching the state of the input terminal TCS.

When the output of the chip select terminal CCS of the camera computer 1 falls and then that of the chip select terminal TCS of the test computer 15 falls as well, the process returns to the main routine.

After inputting the shutter speed adjustment data $\overline{\Delta ts}$ by the serial data transfer at step #210, the camera operator 1 sets '0' at an address designation register AdR for designating an address in the EEPROM 8 at step #211.

At step #212, the shutter speed adjustment data ts having transferred at step #210 is set at a data register CDaR for reading data.

Figure 22:
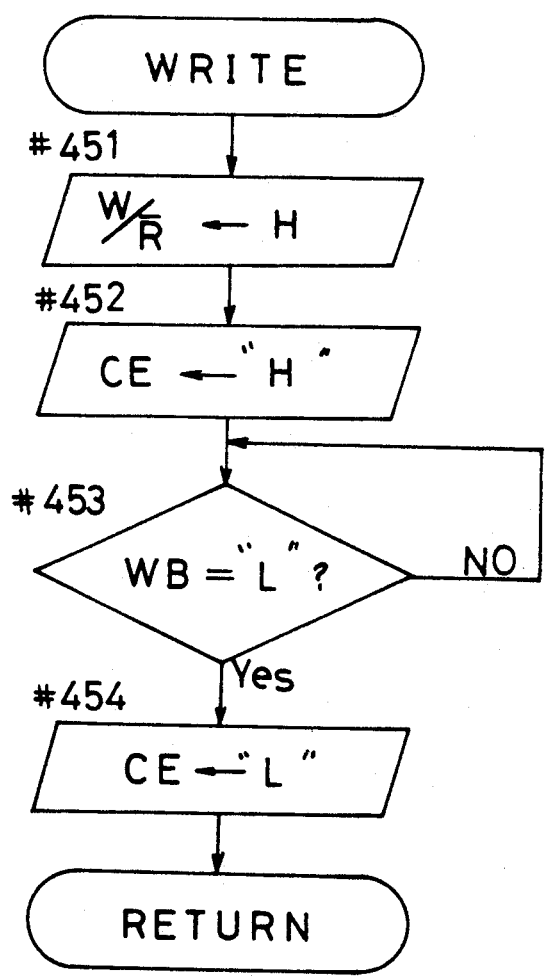

Thereafter, at step #213, a writing subroutine is called for writing the adjustment data set at the data register CDaR into the EEPROM 8. This subroutine is illustrated by a flow chart in FIG. 22.

When this writing subroutine is called, at step #451, the camera computer 1 switches a write-read terminal W/R to 'H' thereby indicating the data writing mode to the EEPROM 8. At step #452, the chip enable terminal CE is switched to 'H' to start the writing operation of the adjustment data into the EEPROM 8.

Referring briefly to this writing operation, when an 'H' signal from the chip enable terminal CE is input to the EEPROM 8, the EEPROM 8 latches the contents of the address register AdR input via an address bus. Then, the adjustment data having transferred via the data bus from the data register CDaR of the camera computer 1 is written into the designated address.

On the other hand, the EEPROM 8 continuously outputs an 'H' write busy signal for indicating the on-going writing operation to a write busy terminal WB of the camera CA. At step #453, the camera computer 1 waits until this write busy signal is stopped. When the write busy signal is stopped, the chip enable terminal CE is switched to 'L' to finish the writing operation at step #454, the process returns to the main routine.

When this writing subroutine is called at step #213, the shutter speed adjustment data $\overline{\Delta ts}$ having been transferred from the test computer 15 at step #210 is written into an address corresponding to '0' in the EEPROM 8. Thereafter, the process returns from the writing subroutine to the shutter speed adjustment 'C' subroutine and further to the main routine.

(iii) adjustment operations

Figure 23:
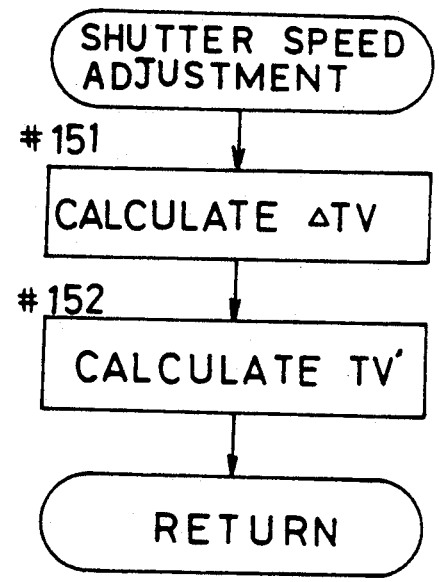

FIG. 23 shows a flow chart illustrating the shutter speed adjustment subroutine. This subroutine is called at step #32 in the routine of the regular photographing shown in FIG. 10B.

When this subroutine is called, at step #151, the camera computer 1 converts the shutter speed adjustment data $\Delta ts$ read from the EEPROM 8 at step #1 and then stored in the register ReO into an adjustment value $\Delta TV$ by the APEX system by the following expression (5') which is a modification of the aforementioned expression (5):

$$\Delta TV = \log_2 (1 + \overline{\Delta ts} \times 2^{TV}) \tag{5'}$$

At step #152, an adjusted exposure time value TV' is obtained by subtracting the adjustment value $\Delta TV$ from the exposure time value TV obtained at step #27 or #29. That is:

$$TV = TV - \Delta TV$$

Thereafter, the process returns to the main routine.

Figure 34:
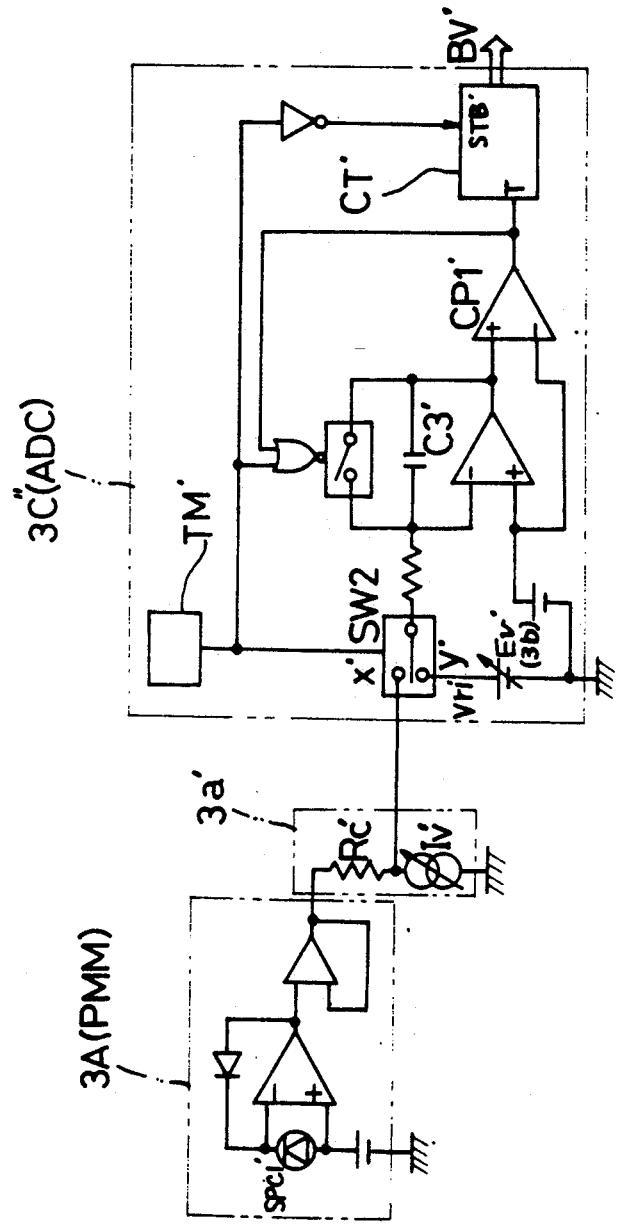
FIG. 34 is a circuit diagram showing a conventional light measuring circuit corresponding to FIG. 5.

(II) light measurement adjustment (i) construction of the light measuring circuit Before describing the light measuring circuit by the present invention, a conventional light measuring circuit will be described with reference to FIG. 34 in order to further distinguish the characterizing features of the present invention.

Referring to the above figure, a reference mark 3A' denotes a light measuring section as light measuring means PMM. In this light measuring section 3A', a light receiving element SPC1' receives light from the object to be photographed whereby an analog voltage signal corresponding to intensity of the light is generated.

A reference mark 3C" denotes an A/D converter section as analog-digital converter means A/DC for digitizing the analog voltage signal from the light measuring section 3A' and then outputting the same.

This A/D converter section 3C" is of the double integral type, functions of which will be briefly described next. First, a timer TM' outputs an 'H' signal to connect a switch SW2' to an upper terminal x' thereby charging a capacitor C3'. When the output of the timer TM' is switched to 'L' after a predetermined time period, the switch SW2' is connected this time to a lower terminal y', whereby the capacitor C3' starts discharging.

Since the rising speed of charged voltage in the course of charging varies depending on the intensity of light received by the light receiving element SPC1, the charged voltage after the predetermined time period varies depending on brightness of the object. On the other hand, the falling speed of the charged voltage in the course of discharging is constant regardless of the object brightness. Accordingly, an inversion timing of the output of a comparator CP1' from 'H' to 'L' varies depending on the object brightness.

A counter CT' is adapted for measuring a time period while the output of the comparator CP1' is maintained to be 'H', and a digital signal output from this counter CT' becomes digital information about the object brightness.

The above-described output from the light measuring section 3A' includes errors due, e.g. to functional errors or tolerances of the components. Thus, in order to obtain the same output under the same light receiving condition, there is provided a first adjustment circuit 3a' constituted by a resistor Rc' and a variable current source Iv', and the adjustment of the output is carried out by manually operating the variable current source Iv' in different ways.

Further, the output from the A/D converter section 3C" also includes errors due, e.g. to functional errors or tolerances of the respective elements. Thus, in order to adjust these errors, there is provided an arrangement in which the electric current in the course of discharging may be maintained constant regardless of the camera by varying a reference voltage Vr1' of a voltage source Ev' to be connected in the discharging of the capacitor C3'. This adjustment is carried out by manually operating in different ways the variable voltage source Ev' which comprises a second adjustment circuit 3b'.

That is to say, in order to always obtain correct object brightness information in spite of the errors of the light measuring section 3A' and the AD converter section 3C", there are provided the two adjustment circuits 3a' and 3b'.

However, in the case of the above conventional construction, since the correct object brightness information is obtained by carrying out adjustments independently for the output of the light measuring section 3A' and for that of the A/D converter section 3C", the two independent adjustment circuits 3a' and 3b' are needed. Therefore, this arrangement often results in disadvantageous complication and enlargement of the circuit construction.

Moreover, since the adjustments by the adjustment circuits 3a' and 3b' are carried out by manually operating the variable current source Iv' and the variable voltage source Ev' repeating many trials and errors, the operations are very troublesome.

Further, since the adjustment for the output of the light measuring section 3A' and that for the output of the A/D converter section 3C' are carried out independently of each other, the preparatory operations for the adjustments take a lot of time and trouble.

Figure 5:
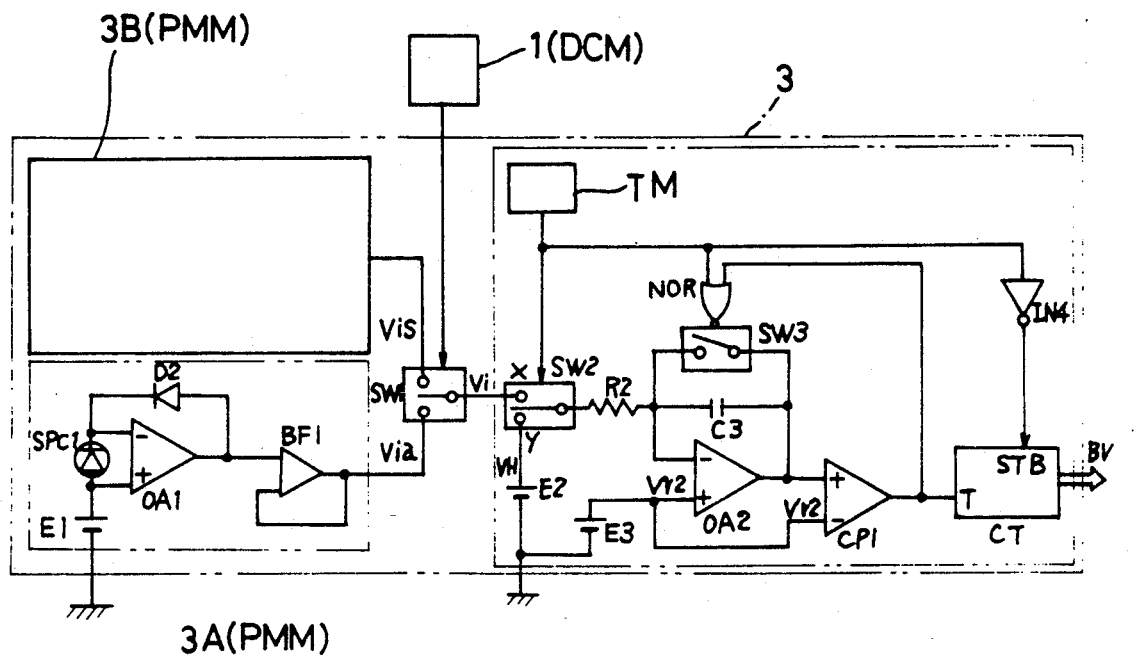
FIG. 5 is a circuit diagram showing a light measuring circuit shown in FIG. 1.

The light measuring circuit 4 of the present invention improved to overcome the above-described drawbacks is shown in FIG. 5.

This light measuring circuit 3 includes the average light measuring section 3A, the spot light measuring section 3B and an A/D converter 3C which is an example of an analog-digital converter means A/DC. The average light measuring section 3A and the spot light measuring section 3B have the same constructions except the light receiving areas. Therefore, only the average light measuring section 3A is shown and will be described next while the spot light measuring section 3B is not shown and will not be described.

The average light measuring section 3A includes a light receiving element SPC1, a voltage source E1 for generating a bias voltage, a diode D2 for a logarithmic compression an operational amplifier OA1, a buffer BF1 and others. In operation, a photoelectric current which is output in accordance with intensity of light received by the light receiving element SPC1 is transferred in voltage and undergoes a logarithmic compression, then the same is output from the buffer BF1 as an analog voltage signal Via.

This voltage signal Via together an analog voltage signal Vis output also from the spot light measuring is input to the light measuring section select switch SW1. Then, depending on the selected light measuring mode, a control signal output from the camera computer 1 at step #20 or #21, this light measuring section switch SW1 is switched, the voltage signal Via or Vis from either of the light measuring sections 3A and 3B is input as a light measuring voltage signal Vi to the A/D converter 3C.

That is to say, both the average light measuring section 3A and the spot light measuring section 3B act as light measuring means PPM for outputting analog information corresponding to the brightness of the object to be photographed.

The A/D converter 3C, formed as a double integral type, includes two power sources E2, E3 for generating two reference voltages Vr1 and Vr2, a resistor R2 and a capacitor C3 for charging and discharging, a switch SW2 for selecting terminals 'x' and 'y', a timer TM for controlling the switch SW2, an operational amplifier OA2, a comparator CP1 for comparing the output of the operational amplifier OA2 with the reference voltage Vr2, a discharging switch SW3 for discharging the capacitor C3, a counter CT for measuring the discharging time of the capacitor C3 and so on. And, the output of the counter CT becomes the digitized brightness value BVo in the APEX system.

Next, the functions of this double-integral type AD converter 3C will be particularly described.

When the light measuring circuit 3 starts a light measuring operation, the timer TM continuously outputs an 'H' signal for a predetermined time period tc, whereby the switch SW2 is connected to the terminal 'x' which is supplied with the light measuring voltage signal Vi and the light measuring voltage signal Vi is input to the A/D converter 3C. At this time, the output of the NOR gate NOR is switched to 'L' thereby opening the discharging switch SW2.

In this condition, the capacitor C3 is charged in accordance with the light measuring voltage signal Vi. An increase amount of voltage Vca at the output side of the operational amplifier OA2 of the capacitor C3 after the lapse of the above predetermined time period tc is expressed by the following equation (6):

$$Vca = (1/c) \cdot \{(Vr2 - Vi)/r\} \cdot tc \qquad (6)$$

c: capacity of the capacitor C3
r: resistance value of the register R2

After the lapse of the predetermined time period tc, the output signal from the timer TM is switched to 'L', whereby the switch SW2 is connected to the terminal 'y' which is supplied with the reference voltage Vr1 and the discharging operation from the capacitor C3 is started.

The 'L' output signal from the timer TM is inverted by the inverter IN4 to be input to the counter CT. Then, the counter CT starts measuring the time period while the output of the comparator CP1 is maintained at 'H'.

During the above time measuring operation, the voltage Vc at the output side of the operational amplifier OA2 of the capacitor C3 falls with a lapse of time. This voltage decrease amount Vcd is expressed by the following equation (7):

$$Vcd = (1/c) \cdot \{((Vr1 - Vr2)/r\}t \qquad (7)$$

t: time lapse

Therefore, a time period td needed for discharging the capacitor by the aforementioned voltage increase amount by the charging operation is expressed by the combination of the equation (6) and the equation (7):

$$Vca = Vcd$$

then, $$td = \{(Vr2 - Vi)/(Vr2 - Vr1)\} \cdot tc$$

When this discharging operation is completed, the output from the comparator CP1 is inverted, and the time period td is measured by the counter CT and then output.

The switching of the output of the comparator CT1 to 'L', it is to be noted, switches the output of the NOR gate NOR to 'H', whereby the discharging switch SW3 is closed and the capacitor C3 is discharged completely.

(ii) principle of adjustment

Figure 6:
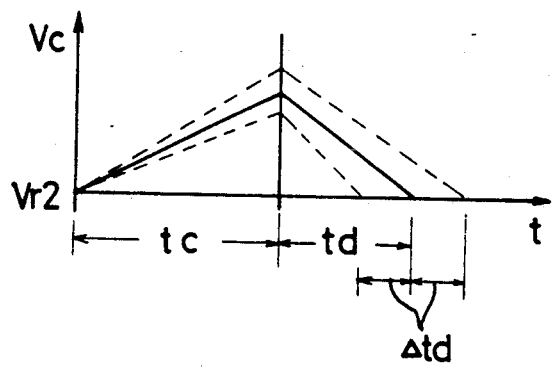
FIG. 6 is a graph showing characteristics of outputs of an A/D converter.

In FIG. 6, there is shown a graph illustrating changes in the voltage Vc at the output side of the operational amplifier OA2 of the capacitor C3 in the above-described A/D conversion operation.

The voltage Vc at the time of charging ideally rises as shown by a solid line in the same figure. The slope of this straight line varies depending on the brightness of the object. Also, even if the object brightness is constant, the slope varies as shown by a broken in the same figure due to tolerance in the light measuring section 3A or 3B.

The voltage Vc at the time of discharging ideally falls as shown by a solid line in the same figure. The slope of this straight line is constant regardless of the object brightness. However, the slope varies as indicated by a broken line due to tolerance in the A/D converter 3C.

Because of the above two tolerances, there occurs a difference Δtd in the discharging time period td measured by the counter CT as shown in the same figure. As the result, the brightness values BVo for the same object varies depending on the camera, whereby a proper photographic image may not be obtained.

Figure 7:
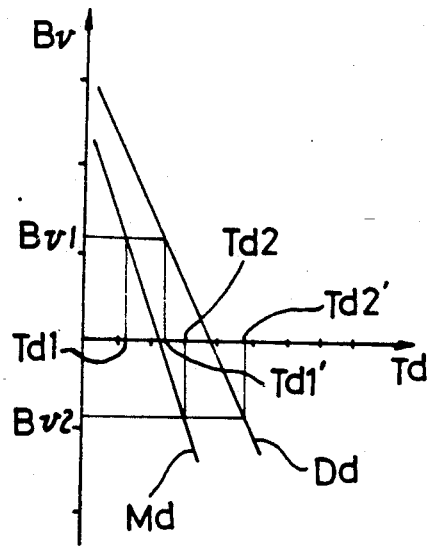
FIG. 7 is a graph illustrating relationship between discharging time periods and object brightness values.

The relationship between the actual object brightness value and the discharging time value Td which comprises the above discharging time period td expressed in the APEX system is illustrated by a graph in FIG. 7.

In this figure, a straight line Dd shows an ideal relationship obtained at the design (design formula). Also, a straight line Md shows an actually measured relationship (actual formula) which includes the aforementioned difference Δts.

The straight line Dd is expressed as:

$$Td(D) = a \cdot Bv + b \qquad (8)$$

The straight line Md is expressed as:

$$Td(M) = c \cdot Bv + b \qquad (9)$$

In the above equations (8) and (9), the variable Bv is assumed to be the correct brightness value.

For a certain object brightness, in order to adjust the brightness value BVo including the tolerance of the light measuring circuit 3 to the ideal brightness value BVo', the discharging time value Td (m) expressed by the above equation (9) is converted into the discharging time value Td (D) expressed by the equation (8). The relationship between these two brightness values Td (m) and Td (D) is expressed by the following equation (10) which substitutes the equation (9) with the equation (8):

$$Td(D) = (a/c) \cdot Td(M) + (b - a \cdot d/c) \qquad (10)$$

The two constants 'c' and 'd' in the equation (9) may be obtained by measuring the respective discharging time periods td under two different object brightness conditions.

If combinations of correct brightness values Bv under these two conditions and discharging time values Td corresponding to the brightness values BVo as output from the light measuring circuit 3 are 'Bv1, Td1' and 'Bv2, Td2' respectively, the constants 'c' and 'd' are obtained by solving the following simultaneous equations (11):

$$c = (Td1 - Td2)/(Bv1 - Bv2) \qquad (11)$$

$$d = (Bv1 \cdot Td2 - Bv2 \cdot Td1)/(Bv1 - Bv2)$$

Also, the two constants 'a' and 'b' in the equation (8) may be obtained by solving the following simultaneous equations (12). That is, if combinations of the correct brightness values Bv under the two different object brightness conditions and ideal discharging time values Td' obtained by calculations are 'Bv1, Td1"' and 'Bv2, Td2"' respectively, in the same manner as the above-described constants 'c' and 'd' in the equation (9):

$$a = (Td1' - Td2')/(Bv1 - Bv2) \brace b = (Bv1 \cdot Td2 - Bv2 \cdot Td1)/(Bv1 - Bv2)} \quad (12)$$

In the equation (10), if:

$$m = a/c \brace n = b - a \cdot d/c} \quad (13)$$

and if the variable Td (m) is expressed as the brightness value BVo as the output of the light measuring circuit 3 and the variable Td (p) is expressed as the adjusted brightness value BVo', then, the equation (10) may be rewritten as the following equation (14):

$$BVo' = m \cdot BVo + n \quad (14)$$

In this equation (14), the two constants 'm' and 'n' may be obtained by substituting the equation (13) with the equations (11) and (12) as follows:

$$m = (Td1' - Td2')/(Td1 - Td2) \quad (15)$$
$$n = \{(Td1 - Td2) \cdot (Bv1 \cdot Td2' - Bv2 \cdot Td1') - (Td1' - Td2') \cdot (Bv1 \cdot Td2 - Bv2 \cdot Td1)\}/(Td1 - Td2) \cdot (Bv1 - Bv2) \quad (16)$$

The above constant 'm' comprises a ratio between the design formula slope and the actual formula slope and becomes the adjustment data for the tolerance in the A/D converter 3C.

The constant 'n' comprises difference between intersections of coordinates of the design formula and the actual formula which is the adjustment data for the tolerance of the average light measuring section A or the spot light measuring section 3B. More particularly, this constant is obtained for each of the two light measuring sections 3A and 3B and the obtained constants become the adjustment data n1 for the tolerance of the average light measuring section A and the adjustment data n2 for that of the spot light measuring section 3B, respectively.

In the adjustment operations to be described hereinafter, the reference brightness light emitting section 17 is actuated to provide two different brightnesses and by using two discharging time periods td measured by the testing device TD in the course of said operation and the above-described equations (15) and (16), the adjustment data 'm', 'n1', 'n2' are obtained. Then, these adjustment data 'm', 'n1', 'n2' are written respectively as the first light measuring adjustment data, the second light measuring adjustment data and the third light measuring adjustment data in to the EEPROM 8 of the camera CA.

In an actual photographing operation, the camera computer 1 reads out these light measuring adjustment data 'm', 'n1', 'n2' and adjusts the calculated brightness value BVo by the necessary light measuring adjustment data 'm', 'n1, 'n2' thereby obtaining the adjusted brightness value BVo' without the tolerance of the light measuring circuit 3.

As the result, the adjusting circuit for the output of the light measuring means PMM and the adjusting circuit for the A/D converter A/DC, both of which are used in the conventional device, are no longer necessary.

(iii) adjustment operations

Figure 24A:
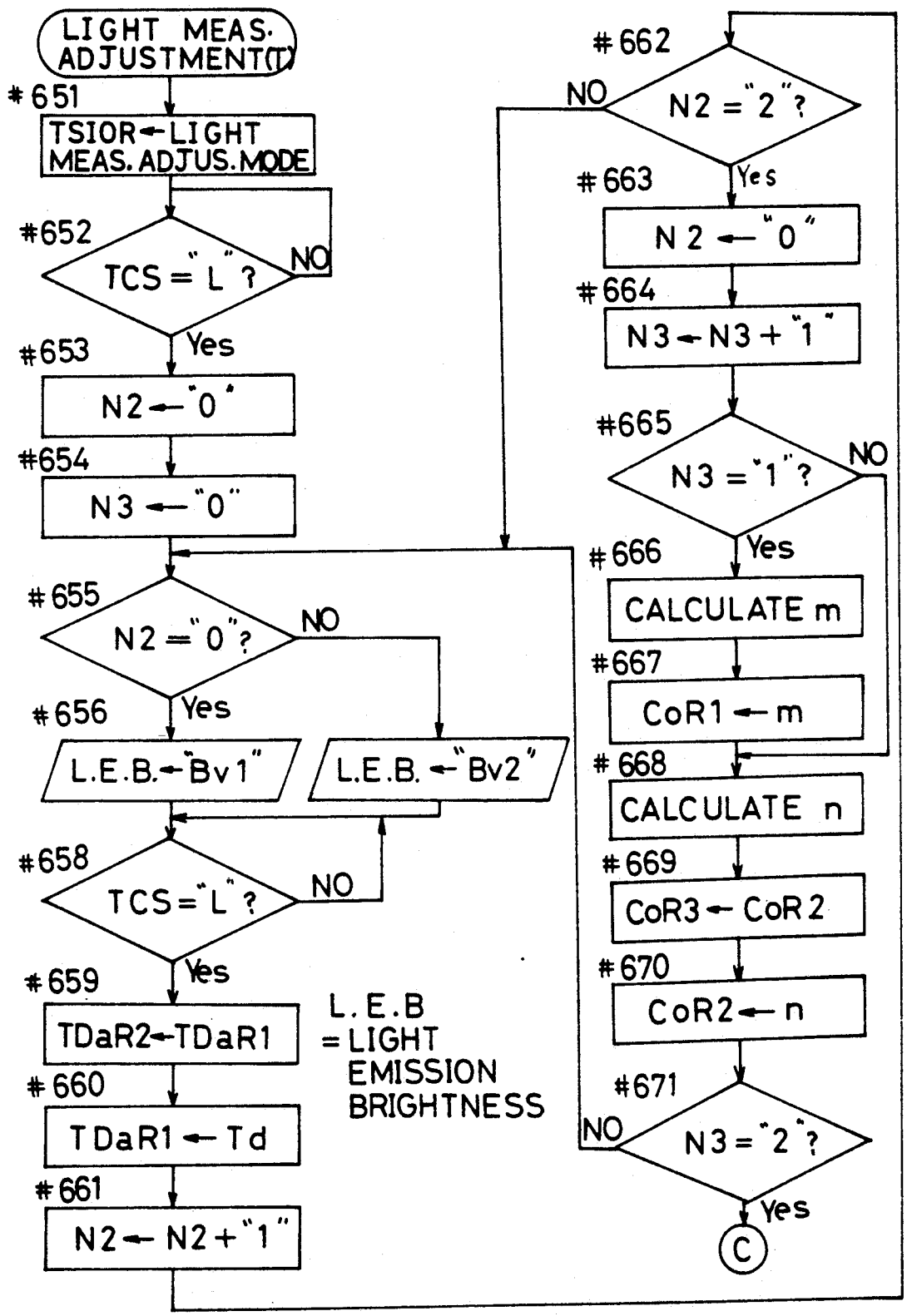
Figure 24B:
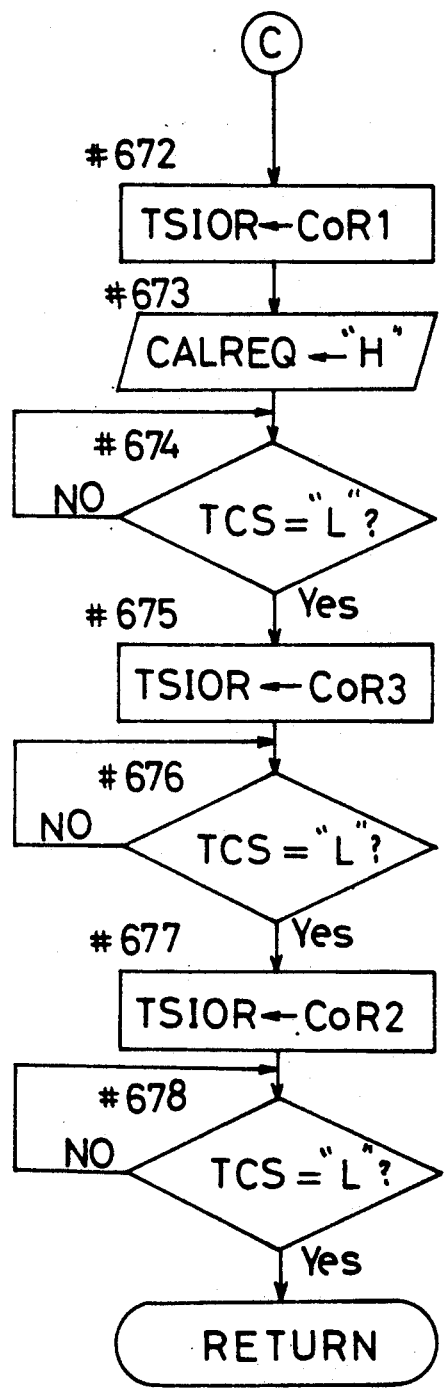

FIGS. 24A and 24B show a flow chart of the light measuring adjustment 'T' subroutine of the test computer 15. This subroutine is called at step #507 in the adjustment operation 'T' subroutine shown in FIG. 19.

When this subroutine is called, as in the case of the shutter speed adjustment 'T' subroutine, the test computer 15 sets the adjustment mode data for indicating the light measurement adjustment mode at the data transfer register TSIOR at step #651. At step #652, the process waits for a completion of the serial data transfer to the camera computer 1. At the following steps #653, #654, when the chip select terminal TCS falls from 'H' to 'L', two variables N2, N3 are respectively reset.

At step #655, a value of the variable N2 is judged. If it is judged at this step that the variable N2 is '0', a light emission control signal for setting the light emission brightness value to Bv1 is output to the reference brightness light emitting section 17 at step #656. On the other hand, if it is judged at step #655 that the variable N2 is not '0', a light emission control signal for setting the light emission brightness to Bv2 is output to the same at step #657.

That is to say, at the above steps #656 and #657, the light is emitted from the reference brightness light emitting section 17 at the two different brightnesses. Then, the process goes on to step #658. At this step #658, the process waits for the chip select terminal TCS to be switched from 'H' to 'L'.

Figure 25:
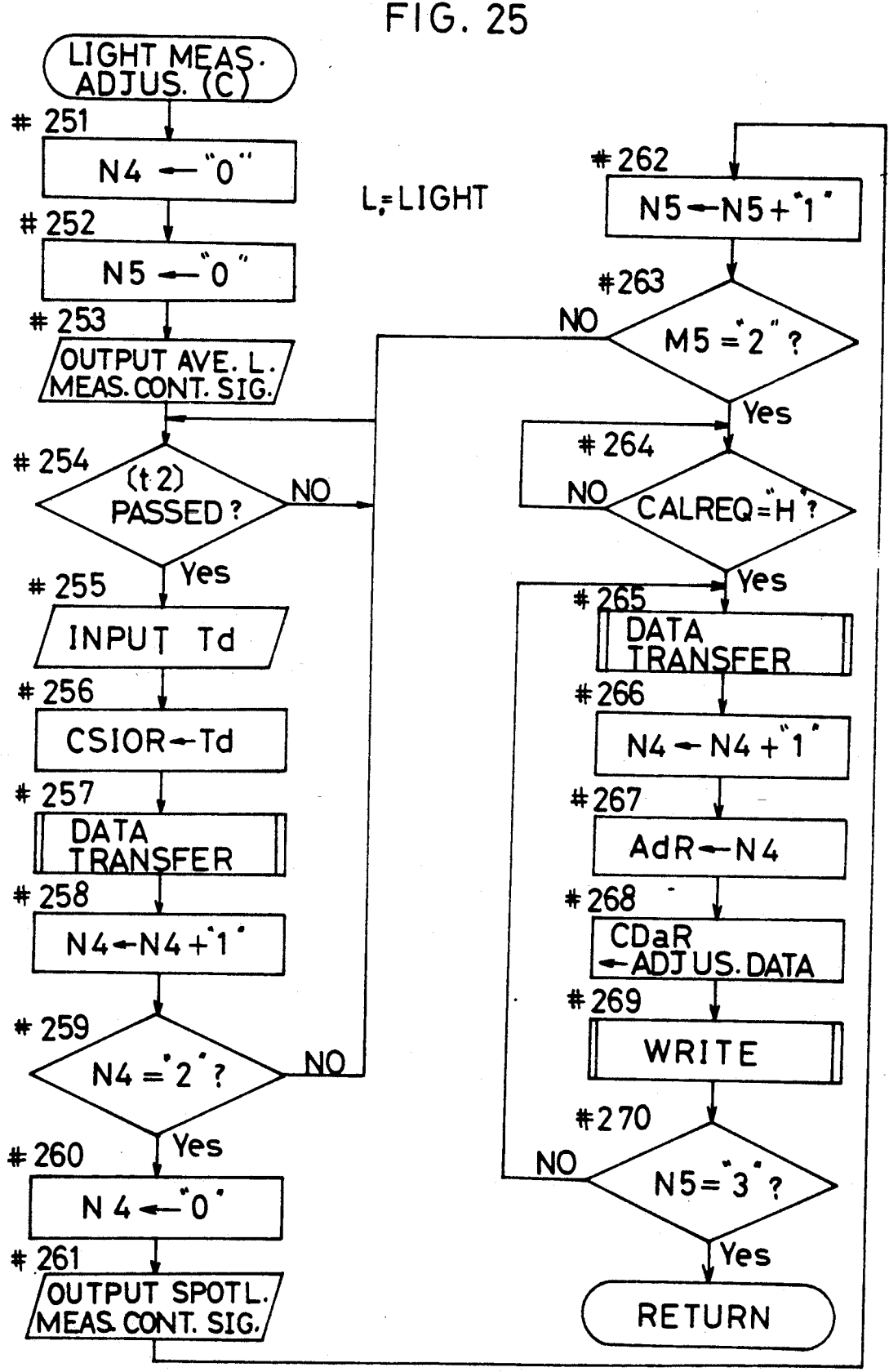

On the other hand, the camera computer 1 receives the above-described adjustment mode data by the serial data transfer at step #52. Then, through the judgment at step #55, the process goes on to step #56 to call the light measuring adjustment 'C' subroutine. This subroutine is illustrated by a flow chart in FIG. 25.

When this subroutine is called, the camera computer 1 resets the two variables N4, N5 respectively at steps #251 and #252. At step #253, a control signal for switching the light measuring section select switch SW1 to the average light measuring section 3A side is output to the light measuring circuit 3. At step #254, the process waits for a lapse of time period t2 needed for stabilizing the brightness of the light emitted from the reference brightness light emitting section 17.

Thereafter, at step #255, the process inputs the brightness value BVo output in the form of a digital signal from the light measuring circuit 3, i.e. the discharging time value Td of the capacitor C3 of the A/D converter 3C.

At step #256, this discharging time value Td is set at the data transfer register CSIOR. Next, the data transfer subroutine is called to transfer the discharging time value Td to the test computer 15 at step #257.

Having output the light emission control signal to the reference brightness light emitting section 17 -10 at step #656 or #657, the test computer 15 waits for a completion of the serial data transfer at step #658. When the serial data transfer at step #257 is completed and the input to the chip select terminal TCS rises, the process goes on to step #659.

At this step #659, the contents of the data register TDaR1 are shifted to the data register TDaR2. At step #660, the discharging time value Td transferred from the camera computer 1 is stored at the data register TDaR1.

With a completion of the serial data transfer at step #257, the camera computer 1 increments the variable N4 at step #258. At the next step #259, it is judged whether or not this variable N4 has become '2', i.e. whether or not the operations from the steps #254 to #258 have been carried out two times.

If it is judged that the variable N4 is not yet '2', the process returns to step #254 to repeat the above operations. On the other hand, if it is judged that the variable N4 has become '2', the process goes on to step #260.

At this step #260, the camera computer 1 resets the variable N4. At step #261, a control signal for switching the light measuring section select switch SW1 to the spot light measuring section 3B side is output to the light measuring section 3. At step #262, the variable N5 is incremented. At the next step #263, it is judged whether or not this variable N5 has become '2', i.e. whether or not the operations from steps #254 to #262 have been carried out respectively for the two light measuring sections 3A and 3B.

If it is judged at step #263 that the variable N5 is not yet '2', the process returns to step #254 to repeat the above operations. On the other hand, if it is judged at the same step that the variable N5 has become '2', the process goes on to step #264.

That is to say, at this stage of the process, the discharging time values Td1 (A), Td2 (A) at two different brightnesses measured by the average light measuring section 3A and the discharging time values Td1 (S), Td2 (S) at two different brightness measured by the spot light measuring section 3B have been transferred from the camera computer 1 to the test computer 15.

On the other hand, after storing the discharging time value Td transferred from the camera computer 1 at step #660, the test computer 15 increments the variable N2 at step #661. At step #662, it is judged whether or not this variable N2 has become '2', i.e. whether or not the operations from step #655 to step #661 have been carried out two times.

If it is judged at this step that the variable N2 is not yet '2', the process returns to step #655 to repeat the above operations. On the other hand, if it is judged at the same step that the variable N2 has become '2', the process goes on to step #663. At this stage of the process, the reference brightness light emitting section 17 has carried out two light emitting operations at two different brightnesses and transfer of two discharging time values Td measured at the light emitting operations and storing of the same respectively at the data registers TDaR2 and TDaR1 have been completed.

At step #663, the test computer 15 resets the variable N2 and then increments the variable N3 at the next step #664. At step #665, it is judged whether or not this variable N3 is '1'.

If it is judged at this step that the variable N3 is '1', the process goes on to step #666. At this stage, the two data registers TDaR2 and TDaR1 respectively stores therein the discharging time values TD1 (A) and TD2 (A) at two different brightnesses measured by the average light measuring section 3A.

At the above step #666, by using these two discharging time values Td1 (A) and Td2 (A) and the aforementioned equation (15), adjustment data 'm' for the tolerance of the A/D converter 3C is obtained. At step #667, the adjustment data 'm' is stored at the adjustment data register CoR1, and then the process goes on to step #668.

If the variable N3 is judged to be '1', at step #668, by using the above two discharging time values Td1 (A) and Td2 (A) and the equation (16), adjustment data n1 for the tolerance of the average light measuring section 3A is obtained. At step #669, the contents of the adjustment data register CoR2 are shifted to an adjustment data register CoR3. And, at step #670, the adjustment data n1 obtained at step #668 is stored at the adjustment data register CoR2.

On the other hand, if it is judged at step #665 that the variable N3 is not '1', the process skips over steps #666 and #667 and then goes on to step #668. At this time, the two data registers TDaR2 and TDaR1 store therein the discharging time values Td1 (S) and Td2 (S) at two different brightnesses measured by the spot light measuring section 3B respectively.

If the variable N3 is not judged to be '1', at step #668, by using the two discharging time values Td1 (S) and Td2 (S) and the equation (16), the adjustment data n2 for the tolerance of the spot light measuring section 3B is obtained. Then, in the same manner as in the previous case, at step #669, the data shift operation is carried out between the adjustment data registers CoR2 and CoR3, and then the adjustment data n2 obtained at step #668 is stored at the adjustment data register CoR2 at step #670.

At step #671, it is judged whether or not the variable N3 has become '2', i.e. whether or not the operations from step #655 to step #670 have been carried out two times for obtaining the adjustment data n1 for the average light measuring section 3A and the adjustment data n2 for the spot light measuring section 3B.

If it is judged at the above step #671 that the variable N3 is not '2', the process returns to step #655. On the other hand, if it is judged at the same step that the variable N3 has become '2', the process goes on to step #672. At this stage, the adjustment data register CoR1 stores therein the adjustment data 'm' and the adjustment data register CoR3 stores therein the adjustment data n1 and the adjustment data register CoR2 stores therein the adjustment data n2, respectively.

At step #672, the adjustment data 'm' stored at the adjustment data register CoR1 is shifted to the data transfer register TSIOR. At step #673, the output of the output terminal CALREQ is switched to 'H' in order to indicate to the camera computer 1 that the calculations of the aforementioned adjustment data 'm', n1, n2 have been completed.

The camera computer 1, at step #264, waits for the output of the output terminal CALREQ of the test computer 15 to be switched to 'H' as watching the state of the input terminal IT6.

With the execution of step #673, the input to the input terminal IT6 of the camera computer 1 is switched to 'H', and then the process goes on to step #265. At this step #265, the aforementioned data transfer subroutine is called to carry out a serial data transfer, whereby the adjustment data 'm' set at the data transfer register TSIOR of the test computer 15 is serially transferred to the camera computer 1.

At step #266, the variable N4 reset at step #260 is incremented, and then this incremented variable N4 is set at the address designation register AdR at step #267.

At step #268, the adjustment data 'm' transferred at step #265 is set at the read-write data register CDaR.

At the next step #269, the above-described writing subroutine is called, whereby the adjustment data 'm' is written as the first light measuring adjustment data into the address of '1' in the EEPROM 8.

After switching the output from the output terminal CALREQ to 'H' at step #673, the test computer 15 waits for the completion of the serial data transfer at step #674. When the serial data transfer at step #265 is completed and the input to the chip select terminal TCS falls, the process goes on to step #675.

At this step #675, the adjustment data n1 set at the adjustment data register CoR3 is shifted to the data transfer register TSIOR. At step #676, the process waits for the completion of the serial data transfer. Upon the completion of this serial data transfer, the adjustment data n2 stored at the adjustment data register CoR2 is set at the data transfer register TSIOR at step #677, and then the process waits for the completion of the serial data transfer at step #678. Upon the completion of this serial data transfer, the process returns to the main routine.

On the other hand, having returned from the writing subroutine called at step #269, at step #270, the camera computer 1 judges whether or not the variable N5 has become '3', i.e. whether or not the operations at steps #265 through #269 have been carried out three times.

If it is judged at this step #270 that the variable N5 is not yet '3', the process returns to step #265 to repeat the above operations. On the other hand, if it is judged at the same step that the variable N5 has become '3', the process returns to the main routine.

At this stage, the adjustment data have been received from the test computer 15 three times and the same have been respectively written into the different addresses in the EEPROM 8. More particularly, besides the above-described first light measuring adjustment data 'm', the adjustment data n1 is written as the second light measuring adjustment data into the address of '2' in the EEPROM 8 and the adjustment data n2 is written as the third light measuring adjustment data into the address of '3' in the EEPROM 8.

(iii) adjustment operations

Figure 26:
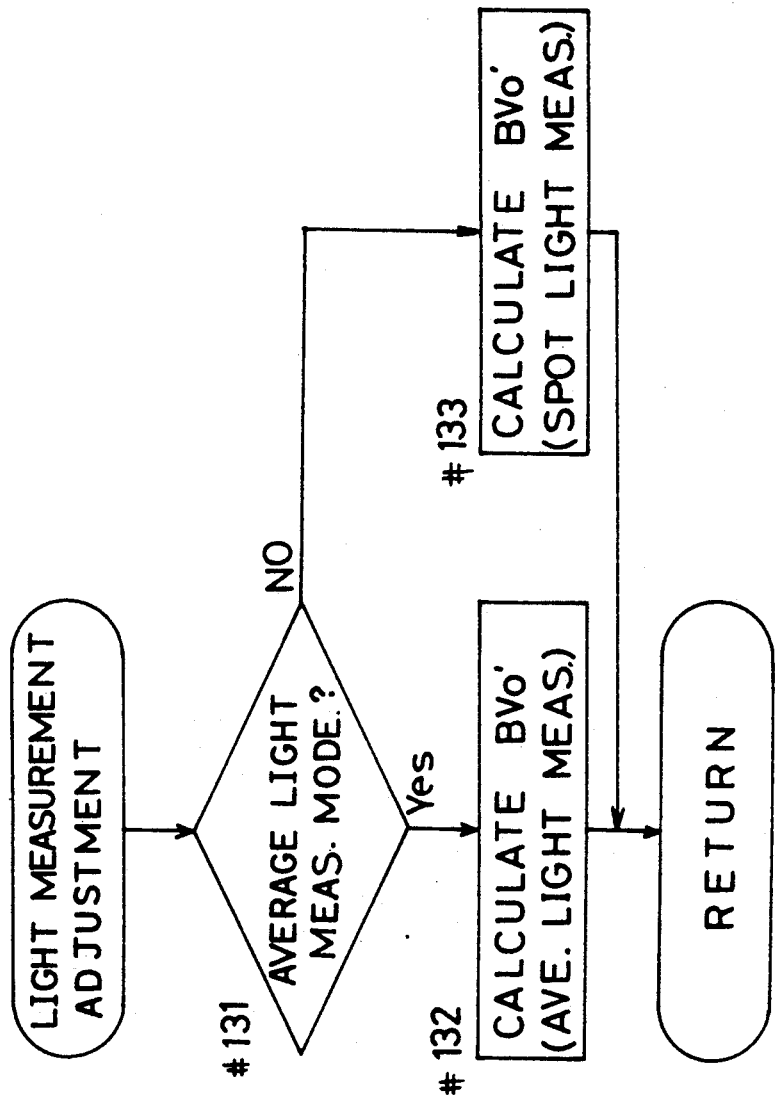

FIG. 26 shows a flow chart illustrating the light measurement adjustment subroutine. This subroutine is called at step #23 in the regular photographing routine shown in FIG. 10B.

When this subroutine is called, at step #131, the camera computer 1 judges from the state of the input terminal IT4 the kind of the selected light measuring mode. Based on the result of this judgment, the process goes on to step #132 in the case of the average light measuring mode or the process goes on to step #133 in the case of the spot light measuring mode, respectively.

At step #132, by using the first light measuring adjustment data 'm' and the second light measuring adjustment data n1 read from the EEPROM 8 at step #1 and then stored at the registers Re1 and Re2, the brightness value BVo input from the light measuring circuit 3 at step #22 is subjected to an adjustment expressed by the following equation (17) to obtain the adjusted brightness value BVo':

$$BVo' = m \cdot BVo + n1 \quad (17)$$

On the other hand, at step #133, in the same manner, by using the first light measuring adjustment data 'm' and the third light measuring adjustment data n2 stored in the registers Re1 and Re3, the brightness value BVo is subjected to an adjustment expressed by the following equation (18) to obtain the adjusted brightness value BVo':

$$BVo' = m \cdot BVo + n2 \quad (18)$$

After carrying out the calculation of the light measuring adjustment at step #132 or #133, the process returns to the main routine.

Figure 35:
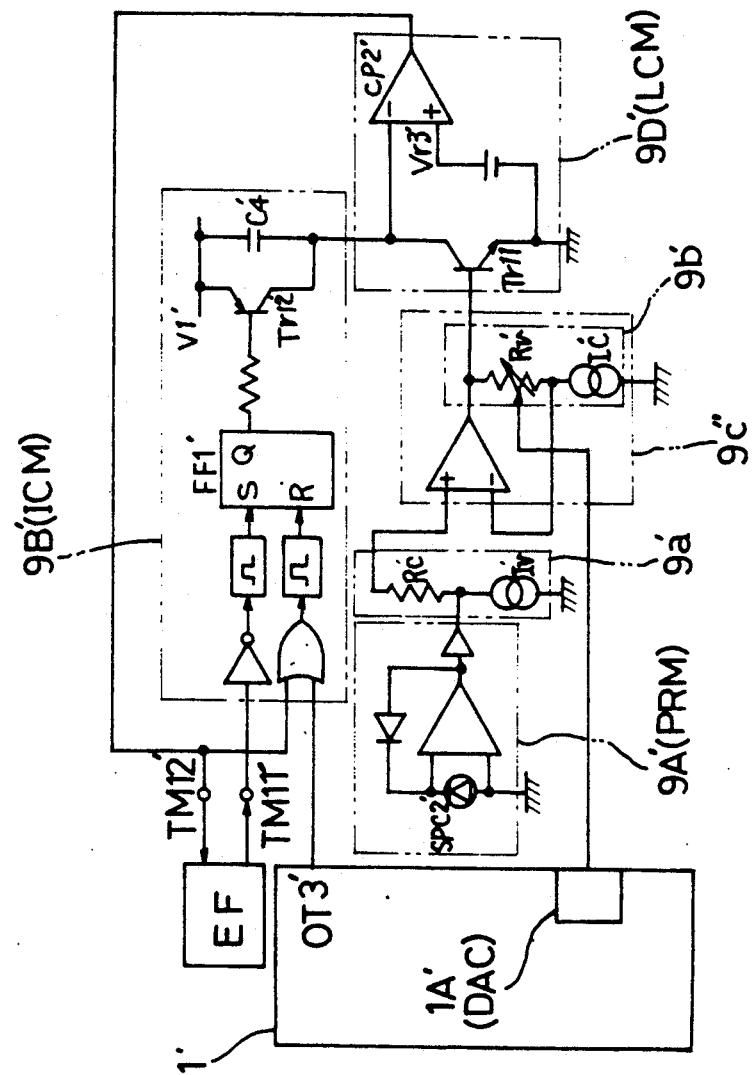
FIG. 35 is a circuit diagram showing a conventional light emission control circuit corresponding to FIG. 8, and FIG. 36A, 36B, 36C show flow charts of a modified embodiment.

(III) light emission control adjustment (i) construction of the light emission control circuit Before describing the light emission control circuit 9 of the present invention, a conventional light emission control circuit will be described with reference to FIG. 35 in order to further distinguish the characterizing features of the present invention.

Referring to the same figure, a reference numeral 1' denotes a microcomputer including a D/A converter circuit 1A. From this D/A converter, which is digital-analog converter means DAC, film speed information stored as digital data in the microcomputer 1' is converted into analog information and then output.

A reference mark 9A' denotes a light receiving section constituting light receiving means PRM. In the case of a flash photography using the electronic flash device EF, a light receiving element SPC2' receives light generated from the electronic flash device EF and then reflected by the object and outputs an analog voltage signal corresponding to intensity of the light.

A reference mark 9B' denotes an integrating section acting as integrating means ICM which starts a charging operation in synchronization with light emission start information of the electronic flash device EF. More particularly, a flip-flop FF1' is normally reset by an 'H' signal from an output terminal OT3' of the microcomputer and a transistor Tr12' is in the state of 'ON', thus, the capacitor C4' is not charged. When an 'L' light emission start signal is input from the electronic flash device EF through a connecting terminal TM11' simultaneously with the start of light emission operation, the flip-flop FF1' is set and the transistor Tr12' is turned 'OFF', whereby charging operation of the capacitor C4' is started.

A reference mark 9C" denotes an adding section, which adds the analog information from the D/A converter circuit 1A' to the analog information from the light receiving section 9A' and then outputs the same as a voltage signal to a base of a transistor Tr11' which collector is connected to the capacitor C4' of the integrating section 9B'.

This transistor Tr11' togetherwith the comparator CP2' constitutes a light emission control section 9D' as light emission control means LCM. The comparator CP2' receives the voltage signal of the connecting point between the capacitor C4' of the integrating section 9B' and the collector of the transistor Tr11' and also the reference voltage Vr3'.

At the initial stage of charging of the capacitor C4, the voltage at the connecting point is higher than the reference voltage Vr3' and the output of the comparator CP2' is in the state of 'L'. As the charging operation by the capacitor C4' proceeds, the voltage at the connecting point between the capacitor C4' and the transistor Tr11' falls. And, when this voltage falls lower than the reference voltage Vr3', the output of the comparator CP2' is inverted to be 'H'.

This rise in the output of the comparator CP2' is transferred to the electronic flash device EF through the connecting terminal TM12', whereby the electronic flash device EF stops the light emission.

The charging speed by the capacitor C4' depends on the film speed and on the intensity of the reflection light received by the light receiving element SPC2' from the object. More specifically, the faster the film speed is, and the higher the intensity of the reflection light from the object is, the larger is the output the adding section 9C'' generates, whereby a larger amount of electric current runs through the transistor Tr11' and the capacitor C4' is charged more quickly. Further, the faster the charging speed of the capacitor C4' is, the sooner the output of the comparator CP2' is inverted and the duration of the light emission becomes shorter.

That is to say, the light emission of the electronic flash device EF is controlled such that exposure amount for the film may be maintained constant regardless of the film speed and of the intensity of reflection light from the object to be photographed.

The output from the above-described light receiving section 9A' includes errors due, e.g. to functional errors or tolerances of the components thereof. Therefore, in order to obtain the same output under the same light receiving condition, there is provided a first adjustment circuit 9a' constituted by a resistor Rc' and a variable current source Iv'. And, the adjustment operation of the output is carried out by manually operating the variable current source Iv' in different ways.

Also, the analog information output from the DA converter circuit 1A' includes errors due, e.g. to functional errors or tolerances of the D/A converter circuit 1A'. Therefore, in order to adjust these errors, there is provided a second adjustment circuit 9b' constituted by a constant current source Ic' and a variable resistor Rv. And, the adjustment of the output is carried out by manually operating the variable resistor Rv' in different ways.

That is to say, the two adjustment circuits 9a' and 9b' are provided such that the light emission control operation may be always carried out properly in spite of the errors and tolerances of the light receiving section 9A' and the D/A converter circuit 1A'.

However, in the case of the above construction, the adjustments of the output of the light receiving section 9A' and of that of the D/A converter circuit 1A' are carried out independently of each other and then the output of the light emission control circuit 9D', which is the calculated result based on the added output of the above two adjusted outputs, is adjusted accordingly. Therefore, the two independent adjustment circuits 9a' and 9b' are needed. This results in disadvantageous complication and enlargement of the overall circuit construction.

Moreover, since the adjustments by the adjustment circuits are carried out by manually operating the variable current source Iv' and the variable resistor Rv' repeating trials and errors, the operations are very troublesome.

Furthermore, the adjustment operation of the output of the light receiving section 9A' and that of the output of the D/A converter circuit 1A' are carried out separately from each other. Thus, the overall operations needed for the adjustments require a lot of time and trouble.

Figure 8:
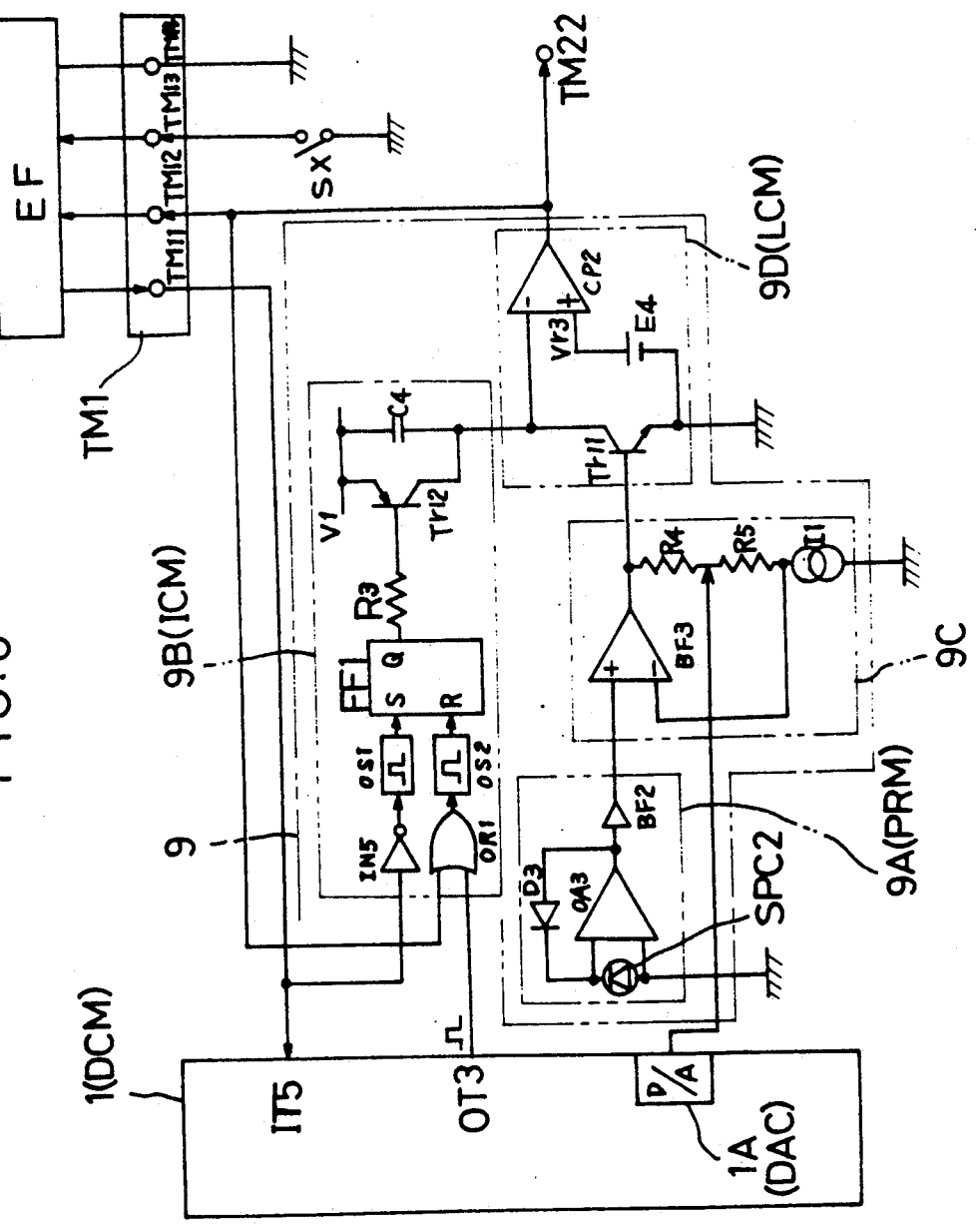
FIG. 8 is a circuit diagram showing a light emission control circuit shown in FIG. 1.

The light emission control circuit 9 by the present invention improved to overcome the above-described drawbacks is shown in FIG. 8.

This light emission control circuit 9 includes a light receiving section 9A, and integrating section 9B, an adding section 9C, a light emission control section 9D and so on.

The light receiving section 9A is constituted by a light receiving element SPC2, a diode D3 for logarithmic compression an operational amplifier OA3, a buffer BF2 and so on. In operation, the light receiving section 9A acts as light receiving means PRM for generating analog information in accordance with intensity of light received from the object to be photographed.

More particularly, in this light receiving section 9A, when the electronic flash device EF emits a flash light, the light receiving element SPC2 receives the light reflected by the object and passing the photographic lens, the photoelectric current output from the light receiving element SPC2 in accordance with the intensity of the light is logarithmically compressed by transforming the voltage thereof and then is output from the buffer BF2 as an analog voltage signal.

The integrating section 9B is constituted by an integrating capacitor C4, a switching transistor Tr12, a resistance R3, an RS flip-flop FF1, two one-shot pulse generating circuits OS1, OS2 an inverter IN5, an OR gate OR1 and so on. In operation, this integrating section 9B acts as integrating means ICM for causing the capacitor C4 to start charging in synchronization with the flash light emission start information of the electronic flash device EF.

Referring briefly to the functions of this integrating section 9B, as described hereinbefore, the camera computer 1 at step #161, for a flash photographing operation, switches the output from the output terminal OT3 to 'H' with a closure of the release switch S2. This 'H' output passes the OR gate OR1 and the one-shot pulse generating circuit OS2 and then resets the RS flip-flop FF1 to switch an output terminal 'Q' thereof to 'L' and the transistor Tr12 is turned 'ON', whereby the capacitor C4 is initialized.

Input to a connecting terminal TM11 is switched to 'H' when a capacitor (not shown) of the electronic flash device EF has been charged up to a predetermined level. This input is also input as a charging completion signal to the input terminal IT5 of the camera computer 1. And, in carrying out a flash photography, when a flash light emission start signal is input to the electronic flash device EF with the closure of the X contact Sx, the electronic flash device EF switches the input to the connecting terminal TM11 to 'L'.

This input comprises flash light emission start information from the electronic flash device EF and the same goes through the inverter IN5 and the one-shot pulse generating circuit OS1 to set the RS flip-flop FF1. Thereby, the output terminal 'Q' thereof is switched to 'H' and the transistor Tr12 is turned 'OFF' to start a charging operation.

The adding section 9C is constituted by a buffer BF3, a pair of resistors R4, R5, a constant current generator I1 and so on. This adding section 9C receives an analog voltage signal output from the light receiving section 9A and an analog voltage signal output from the D/A converter 1A which is an example of digital-analog converting means DAC and the adding section 9C outputs a sum of these two kinds of voltage signals.

The D/A converter 1A is adapted for converting into an analog signal the film speed information read by the camera computer 1 through the decoder circuit 10 and then outputting the same.

The light emission control section 9D is constituted by a transistor Tr11 for logarithmically amplifying a compressed signal, a power source E4 for generating electricity of a reference voltage Vr3, a comparator CP2 and so on. In operation, this light emission control section 9D acts as light emission control means LCM. According to this light emission control means LCM, based on the charging voltage information of the capacitor C4 of the integrating section 9B, the voltage information from the light receiving section 9A and on the voltage information from the D/A converter 1A, when the amount of light from the object has reached a predetermined amount, a flash light emission stop signal is output to the electronic flash device EF.

Referring briefly to the functions of the light emission control section 9D, the voltage output from the adding section 9C is impressed in a base of the transistor Tr11. Therefore, the electric current running through this transistor Tr11 is in proportion to the output of the adding section 9C. A collector of this transistor Tr11 is connected with the integrating capacitor C4, with its connecting point being connected with the negative input terminal of the comparator CP2. On the other hand, the positive input terminal of this comparator CP2 is connected with the power source E4.

For a while after the capacitor C4 starts charging, the voltage at the transistor Tr11 side of the capacitor C4 is higher than the reference voltage Vr3 and the output of the comparator CP2 is maintained at 'L'.

As the charging operation by the capacitor C4 proceeds, the voltage at the transistor Tr11 side of the capacitor C4 falls gradually. And, when this voltage falls below the reference voltage Vr3, the output from the comparator CP2 rises from 'L' to 'H'.

This 'H' signal is output as the flash light emission stop signal from the connecting terminal TM12 to the electronic flash device EF. This 'H' signal is also output from the connecting terminal TM22. Then, until the above-described flash light emission stop signal is output from the light emission control circuit 9 to the electronic flash device EF after the flash light emission start signal is output to the electronic flash device EF with the closure of the X contact Sx, the electronic flash device EF continuously emits the flash light.

The duration of this flash light emission operation varies depending on the intensity of light received by the light receiving element SPC2 and also on the film speed.

That is to say, the charging speed of the capacitor C4 depends on the voltage impressed on the base of the transistor Tr11. The higher this voltage is, the more electric current runs through the transistor Tr11 and the faster is the charging speed of the capacitor C4.

For example, if the intensity of light received by the light receiving element SPC2 is high because of short distance to the object or of a high reflecting ratio of the object, the light receiving element SPC2 generates a large output and so does the adding section 9C and the capacitor C4 is charged quickly. Therefore, the output of the comparator CP2 is inverted sooner. That is, the duration of the light emission operation becomes shorter. Likewise, if the film has a high film speed, the D/A converter of the camera computer 1 generates a large output. Therefore, the adding section 9C also generates a large output and the duration becomes shorter in this case also.

That is to say, this light emission control circuit 9 controls the light emission of the electronic flash device EF in a flash photography such that the exposure amount for the film may be maintained constant regardless of the conditions of the object to be photographed and the film speed.

The 'H' signal which is the inverted output of the comparator CP2 is input also to the OR gate OR1. And, this signal, in the same manner as in the previous case, initializes the capacitor C4.

(ii) principle of adjustment

The above-described light emission control circuit 9 and D/A converter 1A of the camera computer 1 have their own operational tolerances. And, because of these tolerances, there occurs irregularities in the inversion timing of the comparator CP2 and there also occurs a difference Δtf in the light emission duration time tf (to be briefly referred to as light emission time hereinafter). As the result, even if flash photography is carried out under the same condition, a proper exposure with the flash light may not be obtained with a different camera.

Therefore, in the case of the camera CA according to this embodiment, the above difference Δtf is adjusted by the camera computer 1.

Since the film speed information is output as an analog signal from the camera computer 1 to the light emission control circuit 9, the above adjustment operation may be carried out only by adjusting this film speed information without using any special circuit.

In general, there exists a relationship among various factors of photography in exposure as expressed by the following equation (19):

$$A^2 = (S/C) \cdot \int_0^T B(t)dt \tag{19}$$

A: an 'F' number of the photographic lens
S: a film speed
T: an exposure time
B(t): a brightness value of the object
C: a constant The above equation (19) is expressed in the APEX system as follows:

$$BVo - TV = AV - SV$$

In the case of the flash photography, unlike the regular photography using the ambient or day-light, it is impossible to separately express the relationship between the object brightness value and the light emission time. Therefore, in the following description of the adjustment operations, by substituting the flash light with the ambient light, the object brightness value and the light emission time are shown separately in the APEX system. As the result, by adjusting the film speed information, it is possible to adjust the difference Δtf in the light emission time tf due to the tolerances of the DA converter 1A and the light emission control circuit 9.

Figure 9:
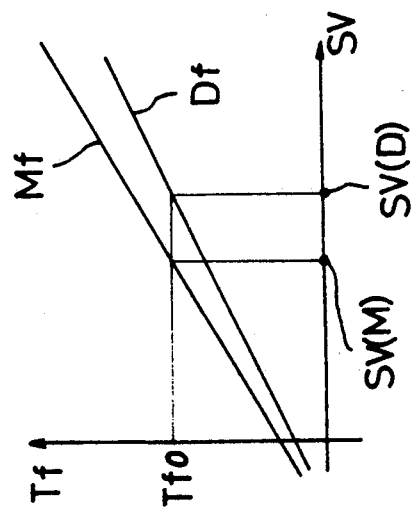
FIG. 9 is a graph illustrating relationship between film speed and light emission control time.

The relationship between the film speed value SV in the APEX system and the light emission time Tf also in the APEX system is illustrated by a graph in FIG. 9.

By maintaining the brightness of the normal light constant, the brightness value BVo of the object is maintained constant, and the aperture value AV is maintained constant by fixing the aperture. Under this condition, the film speed value SV and the light emission time value Tf has a relationship expressed by a linear function.

In FIG. 9, a straight line Df denotes an ideal relationship (design formula) whereas a straight line Mf denotes an actually measured relationship (actual formula) including the difference Δtf.

The straight line Df is expressed as:

$$Tf(D) = e \cdot SV \cdot f \tag{20}$$

The straight line Mf is expressed as:

$$Tf(m) = g \cdot SV + h \tag{21}$$

Under the same photographic condition, in order to eliminate the difference Δtf due to the operational tolerances of the DA converter 1A and the light emission control circuit 9 from the light emission time tf which is the output of the light emission control circuit 9, in the above equations (20), (21), the same film speed values SV resulting in the same light emission time values Tfo are respectively set as 'SV (D)' and 'SV (m)' and the actual film speed value SV (D) is converted into the film speed value SV (m), then the same is output from the DA converter circuit 1A.

The relationship between these two film speed values SV (D) and SV (m) is expressed, if:

$$Tf(D) = Tf(m)$$

then:

$$SV(m) = (e/g) \cdot SV(D) + (f - h)/g \tag{22}$$

The constants 'g' and 'h' in the equation (21) may be obtained by measuring the light emission time tf under two different film speed conditions respectively.

If the combinations of the actual film speed value Sv and the light emission time value Tf under these two different conditions are 'Sv1, Tf1' and 'Sv2, Tf2', respectively and if the same are substituted in the equation (21), then:

$$\left. \begin{array}{l} g = (Tf1 - Tf2)/(Sv1 - Sv2) \\ h = (Sv1 \ Tf2 - Sv2 \cdot Tf1)/(Sv1 - Sv2) \end{array} \right\} \tag{23}$$

The two constants 'e' and 'f' in the equation (20), in the same manner as the two constants 'g' and 'h' in the equation (21), may be obtained by solving the following simultaneous equations (24) in which the combinations of the actual film speed value Sv and the ideal light emission time value Tf' obtained by a calculation are 'Sv1, Tf1''' and 'Sv2, Tf2''' respectively:

$$\left. \begin{array}{l} e = (Tf1' - Tf2')/(Sv1 - Sv2) \\ f = (Sv1 \cdot Tf2' - Sv2 \cdot Tf1')/(Sv1 - Sv2) \end{array} \right\} \tag{24}$$

In the equation (22), if:

$$\left. \begin{array}{l} i = e/g \\ j = (f - h)/g \end{array} \right\} \tag{25}$$

and if the variable SV (m) is expressed as the film speed value SV decoded from the film cartridge and the variable SV (D) is expressed as the adjusted film speed value SV', then:

$$SV' = i \cdot SV + j \tag{26}$$

The two constants 'i' and 'j' in the above equation (26) may be obtained from the following equations (27) and (28) in which the equations (23) and (24) are substituted in the equation (25):

$$i = (Tf1' - Tf2')/(Tf1 - Tf2) \tag{27}$$
$$j = \{Sv1 \cdot (Tf2' - Tf2) - Sv2 \cdot (Tf1' - Tf1)\}/(Tf1 - Tf2) \tag{28}$$

In the adjustment operations to be described next, the reference brightness light emitting section 17 is operated to provide a constant brightness and two different kinds of film speed information are output from the D/A converter circuit 1A and light emission times tf are measured by the testing device TD and then the adjustment data 'i', 'j' are derived from the above equations (27) and (28). Thereafter, these adjustment data 'i' and 'j' are written as the first light emission control adjustment data and the second light emission control adjustment data into the EEPROM 8 of the camera CA.

In an actual photographing operation, the camera computer 1 reads out these two light emission control adjustment data 'i' and 'j' to adjust the film speed value SV to the adjusted film speed value SV'. And, in a flash photographing operation, this adjusted film speed value SV' is converted into an analog signal through the D/A converter circuit 1A of the camera computer 1 to be output to the light emission control circuit 9.

As the result, in spite of the tolerances of the D/A converter circuit 1A and the light emission control circuit 9, the light emission control operation is carried out properly. Consequently, the adjustment circuit for the output of the light receiving means PRM and that for the output of the digital-analog converter means DAC become unnecessary.

That is to say, in the above-described construction, the camera computer 1 acts as the adjustment means DCM.

(iii) adjustment operations

FIG. 27 shows a flow chart illustrating the light emission control adjustment 'T' subroutine of the test computer 15. This subroutine is called at step #509 in the adjustment operation 'T' routine shown in FIG. 19.

When this subroutine is called, at step #701, in the same way as in the shutter speed adjustment 'T' or in the light measuring adjustment 'T', the test computer 15 sets the adjustment mode data indicating the light emission control adjustment mode at the data transfer register TSIOR. At step #702, the process waits for completion of the serial data transfer to the camera computer 1.

At step #703, with a rise of the chip select terminal TCS, a control signal is output for setting the light emission brightness of the reference brightness light emission section 17 to 'Bv3'. After resetting the variable N6 at step #704, the process waits for a measured data read signal to be input to the input terminal IT10 from the camera computer 1 at step #705.

Figure 28:
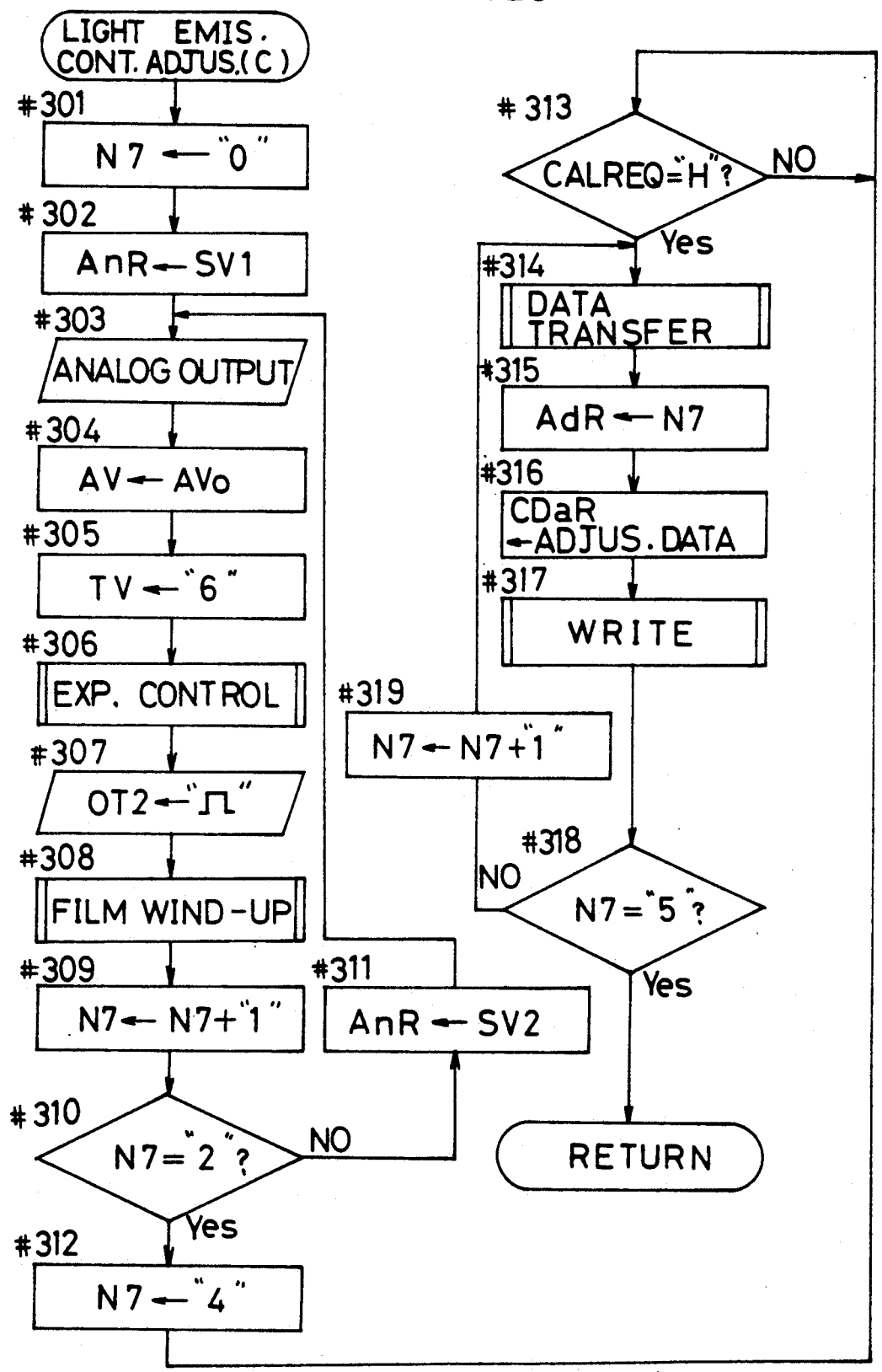

On the other hand, the camera computer 1 receives the adjustment mode data through the serial data transfer at step #52. And, depending on the judgment at step #57, the process goes on to step #58 to call the light emission control adjustment 'C' subroutine. This subroutine is illustrated by a flow chart shown in FIG. 28.

When this subroutine is called, at step #301, the camera computer 1 resets the valuable N7. At step #302, a predetermined film speed value SV1 is set at an analog conversion register AnR and then the same is converted into an analog signal through the D/A converter circuit 1A to be output to the light emission control circuit 9 at step #303.

At step #304, the aperture value AV is set to the open aperture value AVo, and then the exposure time value TV is set to '6' corresponding to a synchronizing speed of 1/60. At step #306, the exposure control subroutine is called to an exposure control operation.

Thereafter, at step #307, a measured data read signal in the form of pulse is output from the output terminal OT2 to the input terminal IT10 of the test computer 15. At step #308 the film winding-up subroutine is called to wind up the film by one frame length.

At step #309, the variable N7 is incremented, and then at step #310, it is judged whether or not this variable N7 has become '2', i.e. whether or not the operations from step #303 to step #309 have been carried out two times.

If it is judged at this step #310 that the variable N7 is not yet '2', a film speed value SV different from the film speed value set at step #302 is set at the analog conversion register AnR at step #311. Then, the process returns to step #303 to repeat the above operations.

On the other hand, if it is judged at step #310 that the variable N7 has become '2', the variable N7 is set to '4' at step #312 and then the process goes on to step #313.

That is to say, at this stage of process, the exposure operation has been carried out two times.

On the other hand, as receiving the measured data read signal from the camera computer 1, the test computer 15 goes on to step #706. At this step #706, the contents of the data register TDaR1 are shifted to the data register TDaR2. After receiving the light emission time tf from the light emission time measuring section 18, the test computer 15 stores this light emission time tf at the data register TDaR1.

This light emission time comprises a time period measured by the light emission time measuring section 18 after the flash light emission start signal is output through the connecting terminal TM23 with the closure of the X contact point Sx until the flash light emission stop signal is output through the connecting terminal TM22 with the completion of light emission operation by the light emission control circuit 9.

At step #709, the variable N6 is incremented, and then at step #710, it is judged whether this variable N6 has become '2', i.e. whether or not the operations from step #705 to step #709 have been carried out two times.

If it is judged at this step that the variable N6 is not yet '2', the process returns to step #705 to repeat the above operations. On the other hand, if it is judged at the same step that the variable N6 has become '2', the process goes on to step #711.

That is to say, at this stage of process, the light emission time tf has been measured two times in accordance with the two-time exposure control operations in the camera CA and the respective measured light emission time tf1 and tf2 have been stored at the two resistors TDaR2 and TDaR1 respectively.

At steps #711 through #714, calculations of the adjustment data are carried out.

First, at step #711, the two light emission times tf1 and tf2 stored at the two registers TDaR2 and TDaR1 are converted into APEX-system light emission time values Tf1 and Tf2 respectively. Then, by using these two light modulating time values Tf1 and Tf2 and the above-described equation (27), the adjustment data 'i' is obtained at step #713 and by using the same and the equation (28), the adjustment data 'j' is obtained at step #714.

When the above adjustment data calculations are completed, the adjustment data 'i' obtained at step #712 is set at the data transfer register TSIOR at step #715. Then, at step #716, the output from the output terminal CALREQ is switched to 'H' in order to indicate the completion of the calculations of the respective adjustment data 'i' and 'j' to the camera computer 1.

The camera computer 1, at step #313, waits for the output from the output terminal CALREQ to be switched to 'H' as watching the state of the input terminal IT6.

With execution of step #716, the input to the input terminal IT6 of the camera computer 1 is switched to 'H' and the process goes on to step #314 to call the data transfer subroutine to carry out a serial data transfer, whereby the adjustment data 'i' set at the data transfer register TSIOR of the test computer 15 is transferred to the camera computer 1.

At step #315, the variable set to '4' at step #312 is set at the address designation register AdR, and then the adjustment data 'i' transferred at step #314 is set at the read-write data register CDaR at step #316.

At step #317, the writing subroutine is called, whereby the adjustment data 'i' is written as the first light emission control adjustment data at the address of '4' in the EEPROM 8.

On the other hand, after switching the output from the output terminal CALREQ to 'H', the test computer 15 waits for completion of the serial data transfer at step #717. When the input to the chip select terminal TCS falls with the completion of the serial data transfer at step #314, the process goes on to step #718.

At this step #718, the adjustment data 'j' obtained at step #713 is set at the data transfer register TSIOR. At step #719, the process waits for completion of the serial data transfer. Then, with the completion of the serial data transfer, the process returns to the main routine.

On the other hand, after returning from the writing subroutine called at step #317, the camera computer 1 judges at step #318 whether or not the variable N7 is '5', i.e. the operations from step #314 to step #317 have been carried out two times.

If it is judged at this step that the variable N7 is not yet '5', this variable N7 is incremented at step #319, and then the process returns to step #314 to repeat the above operations. On the other hand, if it is judged at the same step that the variable N7 has become '5', the process returns to the main routine.

At this stage, the camera computer 1 has received the adjustment data from the test computer 15 two times and these adjustment data have been written into the different addresses in the EEPROM 8. More specifically, besides the first light emission control adjustment data 'i', the adjustment data 'j' has been written into the address of '5' in the EEPROM 8 as the second light emission control adjustment data.

(iv) adjustment operations

Figure 29:
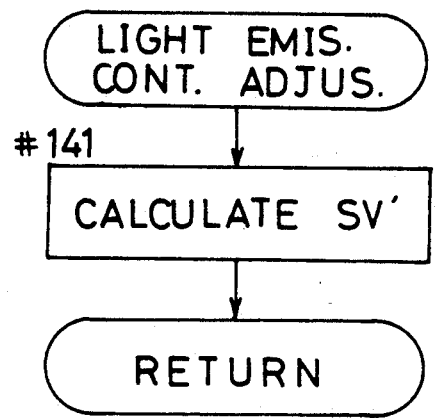

FIG. 29 shows a flow chart illustrating the light emission control adjustment subroutine. This subroutine is called at step #30 in the regular photography operation routine shown in FIG. 10B.

When this subroutine is called, the camera computer 1, by using the first light emission control adjustment data 'i' and the second light emission control adjustment data 'j' read out from the EEPROM 8 at step #1 and then stored respectively at the registers Re4 and Re5, carries out on the film speed value SV input from the data read circuit 10 at step #24 an adjustment expressed by the following equation (29) to obtain the adjusted film speed value SV' at step #141:

$$SV' = i \cdot SV + j \qquad (29)$$

Then, the process returns to the main routine.

(IV) focus detection adjustment

(i) principle of adjustment

Figure 33:
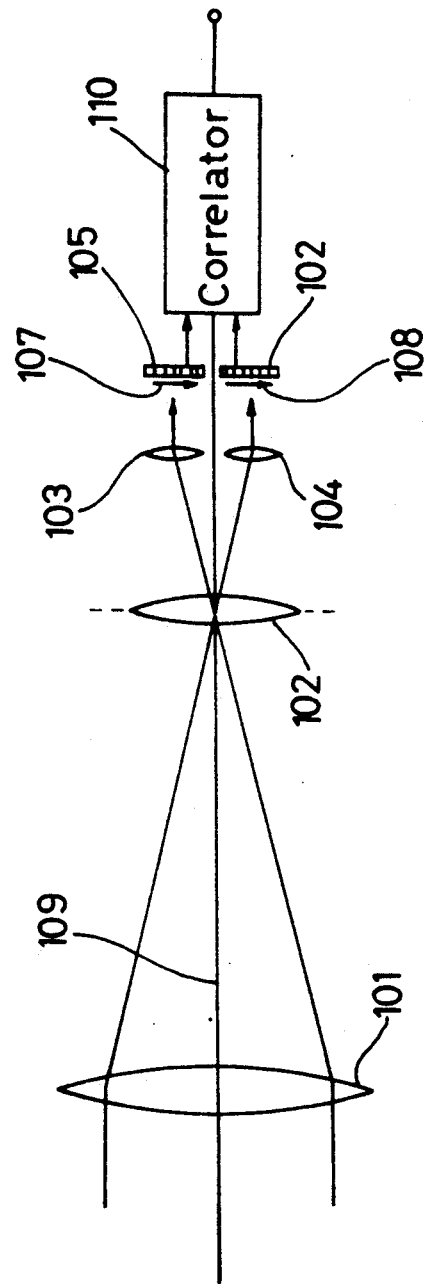
FIG. 33 is a diagram showing a conventional optical unit for a focus detecting circuit

In a focus detecting operation, such errors or tolerances as follows should be considered: a tolerance of the focus detecting circuit 2 per se, a tolerance of an CCD type line sensor (not shown) on which an image of light having passed different regions of the photographic lens is formed, a tolerance of the A/D converter circuit (not shown) for digitizing the analog signal output from the above line sensor to be output to the camera computer 1 and a tolerance of an optical system including the above line sensor due to the fact that the optical system is attached to the camera body with its axis being displaced relative to the optical axis. The construction of the above optical system will be described next with reference to FIG. 33.

Referring to the same figure, at a position equivalent to a predetermined focal plane of an objective lens 101 (i.e. a film exposure plane) there is disposed a condensor lens 102 and behind this condensor lens are provided a pair of image forming lenses 103, 104 and a pair of line sensors 105, 106. These line sensors 105, 106 are disposed on image forming planes of image forming lenses 103, 104 and each of them is composed of a CCD (charge coupled device). In a front focus condition where an object image to be the subject of the focus detection is formed in front of the predetermined focal plane of the object lens, two images 107, 108 formed by image forming lenses 103, 104 on the line sensors 106, 105 respectively are near the optical axis 109 of the objective lens. In contrast, two images 107, 108 are remote from the optical axis in a rear focus condition where the object image is formed behind the predetermined focal plane of the objective lens. In an in-focus condition where the object image is formed on the predetermined focal plane, the distance between the corresponding points of the two images 107, 108 becomes a specific length determined by the construction of the optical system. Accordingly, if the patterns of the light distributions on the line sensors 105, 106 are converted into electrical signals respectively, the focus condition can be found out by comparing these electrical signals to detect the positional relationship between the two images. It is also to be noted that a reference numeral 110 denotes a correlator.

As the result, these tolerances result in irregularities of output from this focus detecting circuit 2 and there occurs a difference $\Delta Df$ in a displacement Df of the photographic lens from the focused position relative to the object (to be referred to as a defocusing amount hereinafter). As the result, depending on the camera, a photographing is sometimes carried out with different focuses for the object in the same distance, whereby a proper photographic image may not be obtained.

Thus, in the adjustment operations to be described next, a known reference lens is attached to the camera CA with the lens being focused for an object placed at a predetermined position (e.g. 1 m away from the camera CA). Also, a test object is placed at a position different from the above predetermined position (e.g. 2 m away from the camera CA).

Then, by the testing device TD, the differences Df between the defocusing amounts Df calculated based on the result of the focus detection carried out several times by the focus detecting circuit 2 and an ideal defocusing amount Df (D) are obtained. Thereafter, an average value $\Delta Df$ of these differences $\Delta Df$ is written into the EEPROM 8 of the camera CA as the focus detection adjustment data.

In an actual photographing operation, the camera computer 1 reads out this focus detection adjustment data $\Delta Df$ and adjusts the calculated defocusing amount Df by this focus detection adjustment data $\Delta Df$ to obtain the adjusted defocusing amount Df' which is free from the adverse effect of the tolerances.

(ii) adjustment operations

Figure 30:
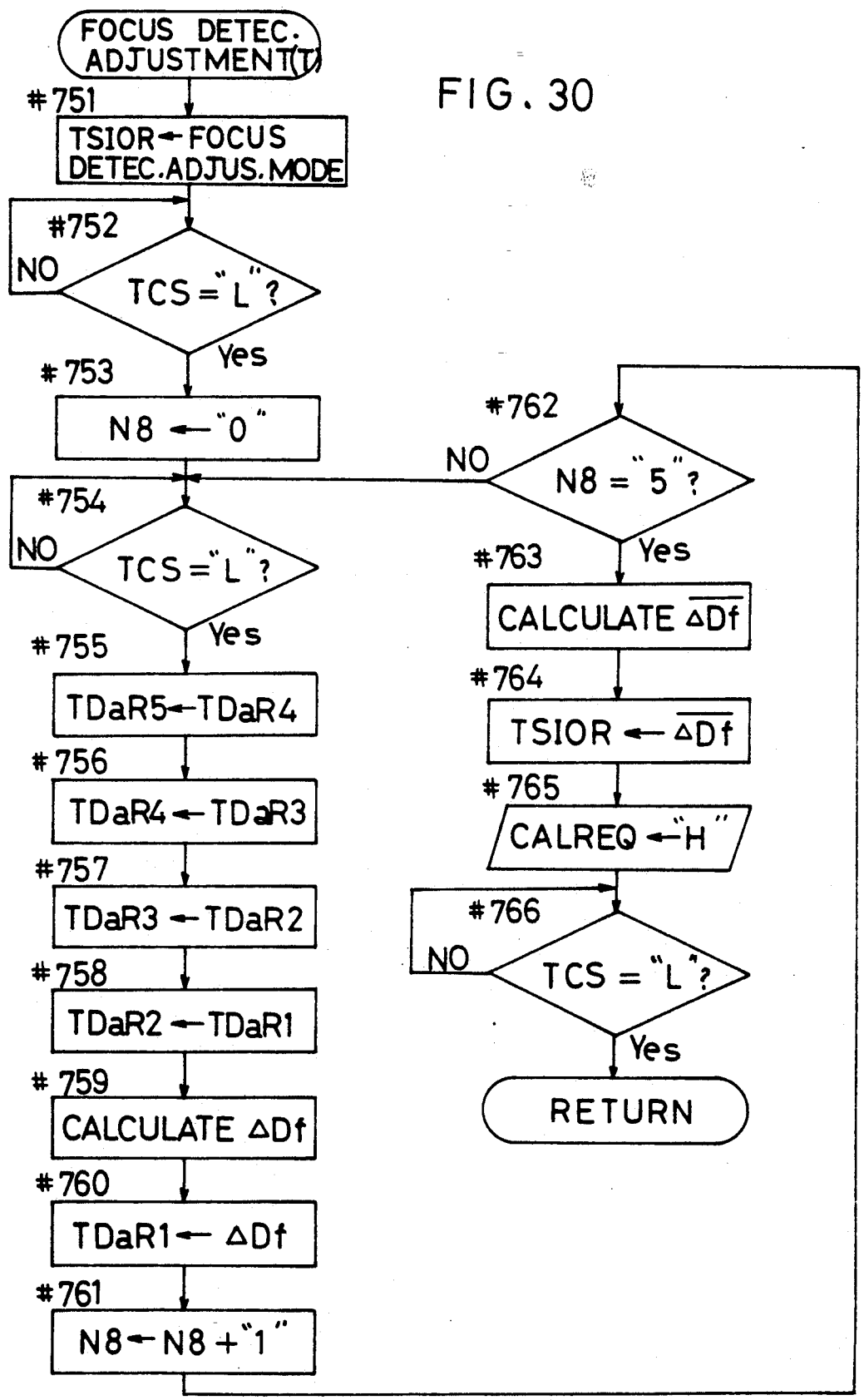

FIG. 30 shows a flow chart illustrating the focus detection adjustment 'T' subroutine. This subroutine is called at step #510 in the adjustment operation 'T' routine shown in FIG. 19. At this time, the testing conditions described hereinbefore in the principle of adjustment (i) are set.

When this subroutine is called, the test computer 15 sets the adjustment mode data indicating the focus detection adjustment mode at the data transfer register TSIOR at step #751. At step #752, the process waits for completion of the serial data transfer to the camera computer 1.

With a fall of the chip select terminal TCS, the variable N8 is reset at step #753. Thereafter, at step #754, the process waits for completion of the serial data transfer of the defocusing amount Df from the camera computer 1. This defocusing amount Df was obtained as the camera computer 1 inputs a detection result detected by the focus detecting circuit 2 and carries out a predetermined calculation thereon.

Figure 31:
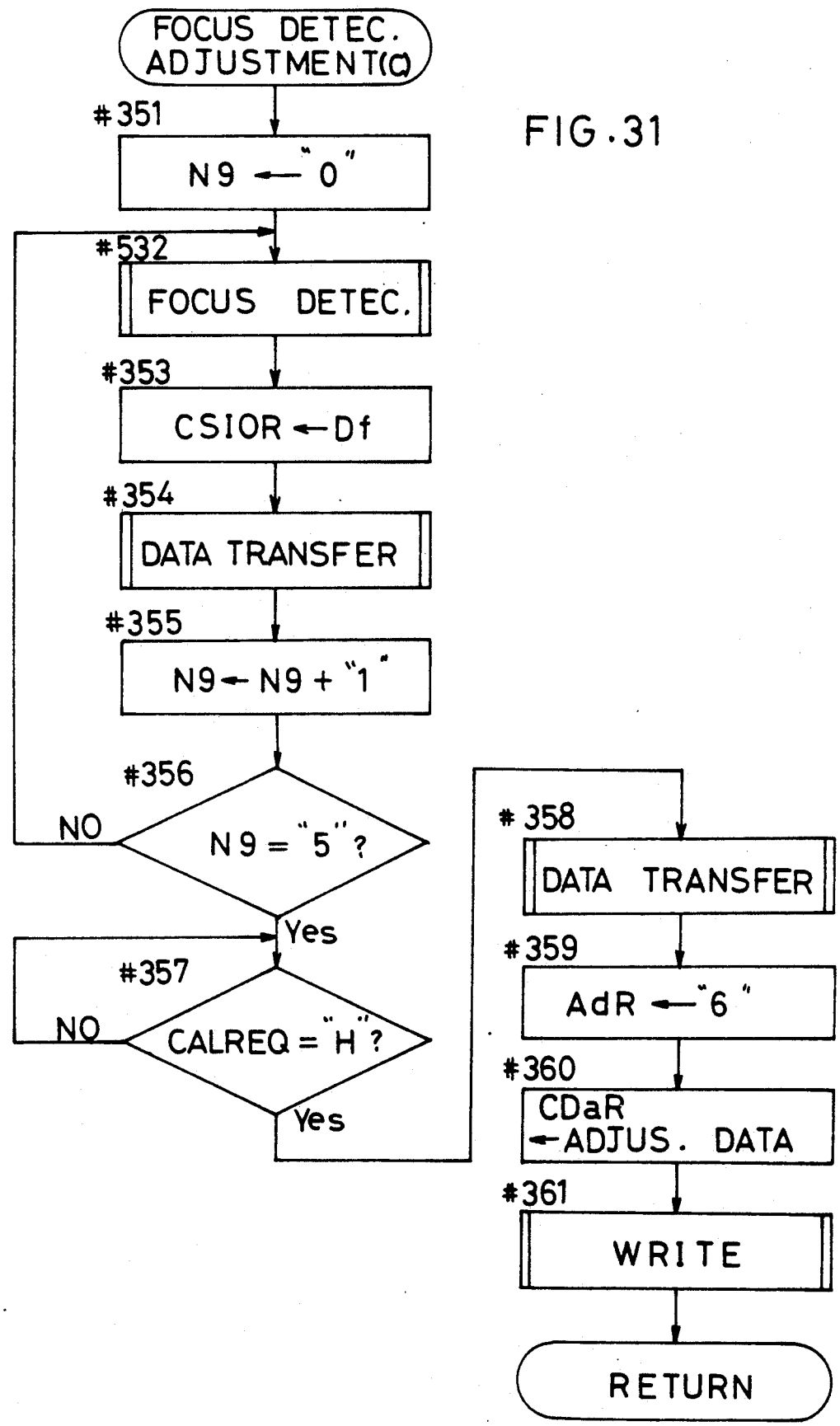

On the other hand, the camera computer 1 receives the aforementioned adjustment mode data by the serial data transfer at step #52 and then through the judgment at step #57 goes to step #59 to call the focus detection adjustment 'C' subroutine. This subroutine is illustrated by a flow chart shown in FIG. 31.

When this subroutine is called, at step #351, the camera computer 1 resets a variable N9. Next, at step #352, in the same manner as in the photographing mode, the focus detection subroutine is called and the defocusing amount Df is obtained based on the detection result input from the focus detecting circuit 2.

At step #353, this defocusing amount Df is set at the data transfer register CSIOR. At step #354, the data transfer subroutine is called to carry out a serial data transfer, whereby the defocusing amount Df is transferred to the test computer 15.

At step #355, the variable N9 is incremented. At step #356, it is judged whether or not this variable N9 has become '5', i.e. whether or not the operations from step #352 to step #355 have been carried out five times.

If it is judged at this step that the variable N9 is not yet '5', the process returns to step #352 to repeat the above operations. On the other hand, if it is judged that the variable N9 has become '5', the process goes on to step #357.

That is to say, at this stage of process, the focus detection operation has been carried out five times and five defocusing amounts Df have been transferred to the test computer 15.

The test computer 15 waits for completion of the serial data transfer of the defocusing amount Df at step #754. With a fall of the chip select terminal TCS, the process goes on to step #755.

At steps #755 through #758, data rotations are carried out from the lower side to the upper side between the five data registers TDaR1 through TDaR5.

Thereafter, at step #759, a difference ΔDf between the defocusing amount Df transferred from the camera computer 1 and the ideal defocusing amount Df (D) is obtained, and the same is stored at the least significant data register TDaR1 at step #760.

At step #761, the variable N8 is incremented. At the next step #762, it is judged whether or not this variable N8 has become '5', i.e. whether or not the operations from step #754 to step #761 have been carried out five times.

If it is judged that the variable N8 is not yet '5', the process returns to step #754 to repeat the above operations. On the other hand, if it is judged at the same step that the variable N8 has become '5', the process goes on to step #763.

That is to say, at this stage of process, in accordance with the five focus detection operations, the differences ΔDf1 through ΔDf5 between the calculated defocusing amounts Df and the ideal defocusing amount Df (D) have been stored in order at the five data resistors TDa5 through TDa1.

At step #763, an average value $\overline{\Delta Df}$ of these differences Df1 through Df5 is obtained. That is:

$$\overline{\Delta Df} = (\Delta Df1 + \Delta Df2 + \Delta Df3 + \Delta Df4 + \Delta Df5)/5$$

At step #764, this average value $\overline{\Delta Df}$, which is to be used as focus detection adjustment data, is set at the data transfer register TSIOR. At step #765, the output from the output terminal CALREQ is switched to 'H' in order to indicate to the camera computer 1 completion of calculation of the focus detection adjustment data.

The camera computer 1, at step #357, waits for the output of the output terminal CALREQ of the test computer 15 to be switched to 'H' as watching the state of the input terminal IT6.

With execution of step #765, the input to the input terminal IT6 of the camera computer 1 is switched to 'H' and then the process goes on to step #358 to call the data transfer subroutine to carry out a serial data transfer, whereby the focus detection adjustment data $\overline{\Delta Df}$ set at the data transfer register TSIOR of the test computer 15 is transferred to the camera computer 1.

After switching the output from the output terminal CALREQ to 'H' at step #765, the test computer 15 waits for completion of the serial data transfer at step #766. When the serial data transfer at step #358 is completed and the input to the chip select terminal TCS falls, the process returns to the main routine.

After completing the serial data transfer at step #358, the camera computer 1 sets '6' to the address designation register AdR at step #359. At step #360, the focus detection adjustment data $\overline{\Delta Df}$ transferred at step #358 is set at the read-write data register CDaR.

At the next step #361, the writing subroutine is called, whereby the focus detection adjustment data $\overline{\Delta Df}$ is written in the address of '6' in the EEPROM 8. Thereafter, the process returns from the writing subroutine and then returns to the main routine.

(iii) adjustment operations

Figure 32:
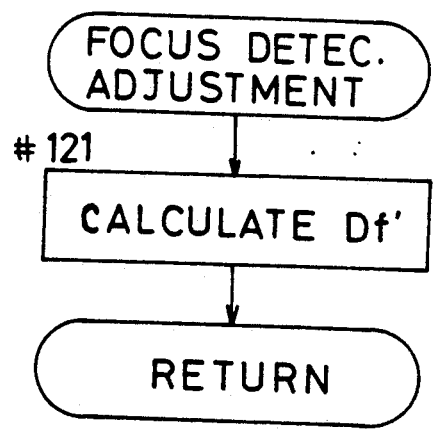

FIG. 32 shows the focus detection adjustment subroutine. This subroutine is called at step #16 in the regular photographing operation routine shown in FIG. 10A.

When this subroutine is called, using the focus detection adjustment data $\overline{\Delta Df}$ read from the EEPROM 8 at step #1 and stored at the register Re6, the camera computer 1 carries out an adjustment of the defocusing amount Df calculated at step #15 to obtain an adjusted defocusing amount Df'. This adjustment is expressed as follows:

$$Df' = DF + \overline{\Delta Df} \qquad (30)$$

Thereafter, the process returns to the main routine.

Other Preferred Embodiments

In the above-described embodiment, the signal communication between the camera CA and the testing device TD is carried out through the group of terminals TM3 adapted for decoding the camera detection code formed on the film cartridge. In place of this, it is also possible to employ a group of terminals (not shown) provided at the back lid of the camera CA and used for data communication between circuits and the camera CA capable of impressing photography data in the film or carrying out a photographing operation by a predetermined interval automatically.

Further, in the case of adjustment operations except those for the light emission control circuit 9, the group of terminals TM1 or TM2 for connecting the electronic flash device EF to the camera CA may be employed.

In the previous embodiment, the EEPROM 8 is provided independently of the camera computer 1. However, the EEPROM 8 may be integrated into the camera CA, and this arrangement is more advantageous in space economy.

Also, in the construction of the previous embodiment, the D/A converter circuit 1A as the digital-analog converter means DAC is incorporated into the microcomputer 1 of the camera CA. In place of this, the D/A converter circuit 1A may be provided independently thereof.

Further, in the previous embodiment, the adjustment of the tolerance of the light emission control circuit 9 is carried out by the program of the microcomputer 1 of the camera CA. In place of this, the adjustment may also be carried out by providing adjustment means DCM.

Still further, in the previous embodiment, the output signal from the digital-analog converter circuit 1A incorporated in the camera computer 1 is added by the adding section 9C to the output signal from the light receiving section 9A and then the same is subtracted from the charging voltage information of the integrating capacitor C4 to be compared with the reference voltage Vr3. In place of this arrangement, though not shown, it is also possible to subtract in advance the output signal from the digital-analog converter circuit 1A from the charging voltage of the integrating capacitor C4 or subtract in advance the same from the reference voltage Vr3. Or, it is also possible to subtract in advance the output signal from the adding section 9C additionally including the output signal from the digital-analog converter circuit 1A from the reference voltage Vr3 and then to compare this with the charging voltage of the integrating capacitor C4.

Modified embodiments will be described next.

Figure 36A:
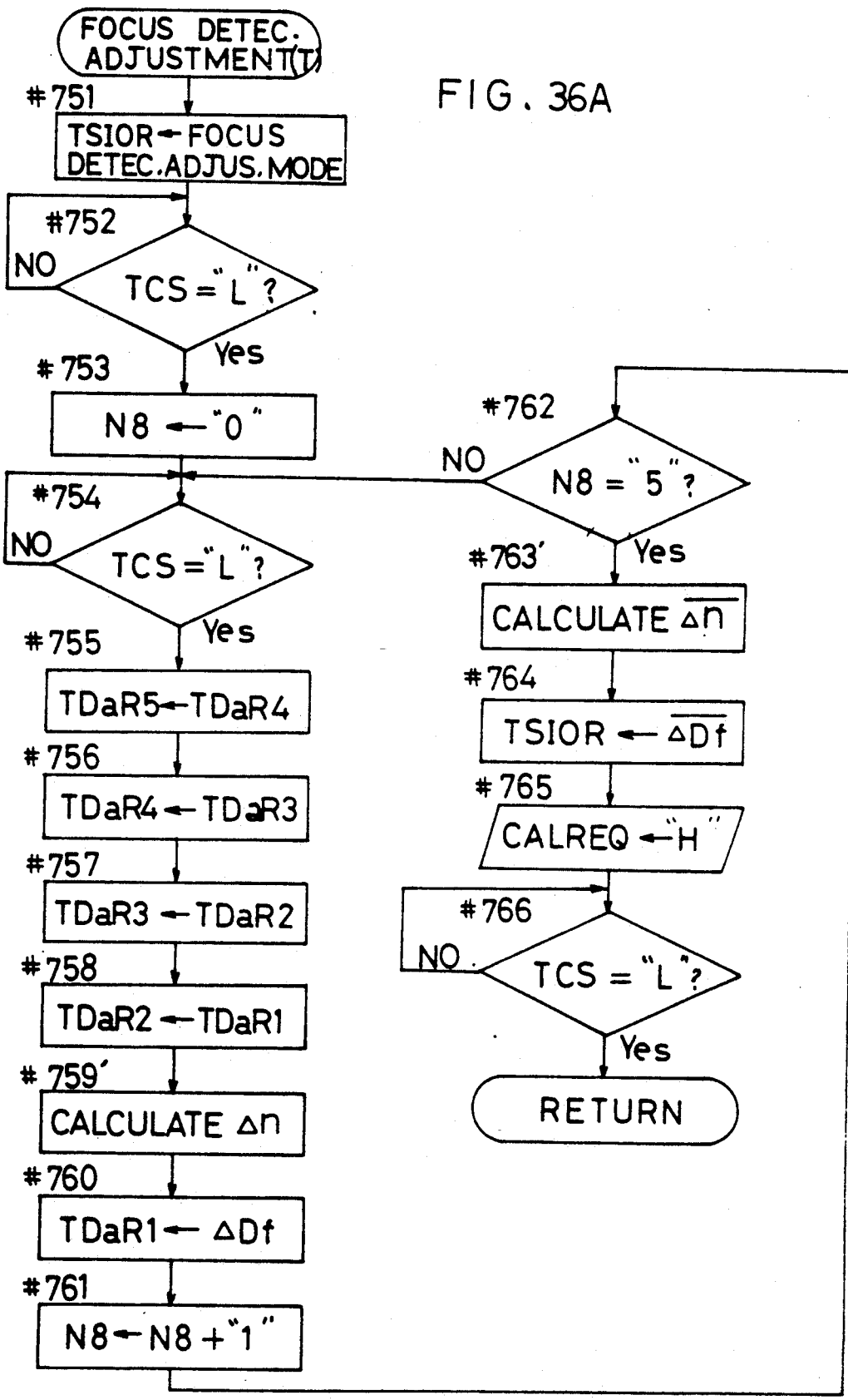
Figure 36B:
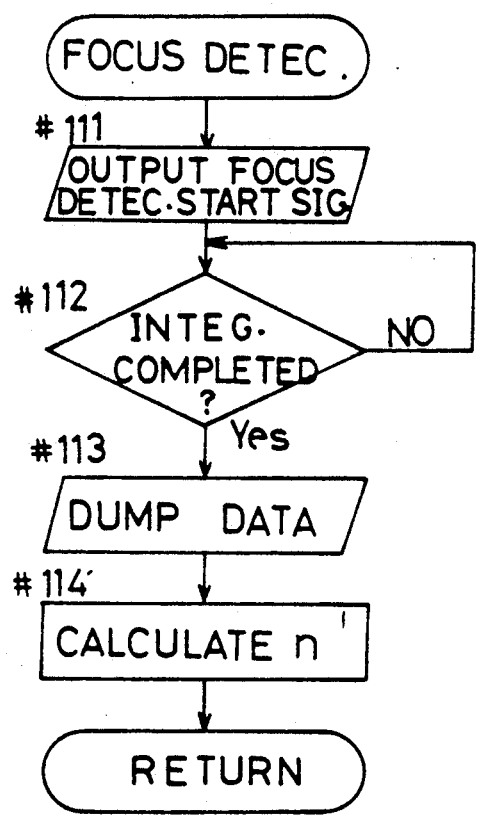
Figure 36C:
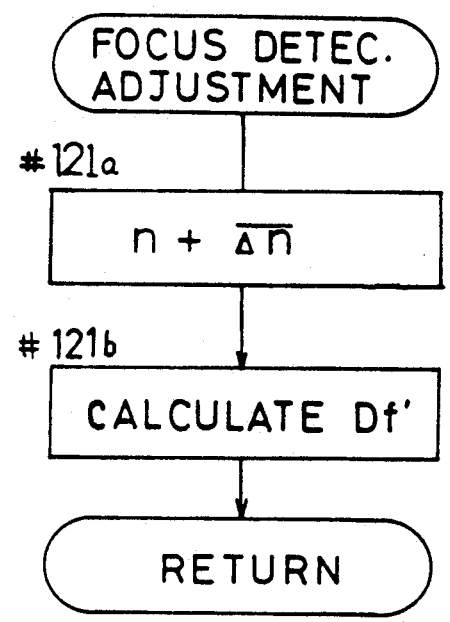

In the above-described focus detecting adjustment, the defocusing amount on the film surface is used as the adjustment data. In place of this, data obtained before the defocusing amount calculation may be utilized as the adjustment data. In the case of the phase-difference detecting method (U.S. Pat. No. 4,349,263), lights passing through different exit pupils are respectively received by first and second light receiving sections having a plurality of light receiving elements. Then, an image formed on the first light receiving section and an image formed on the second light receiving section are gradually shifted to be compared with each other, thereby detecting a portion having the maximum correlation coefficient value. And, based on the shifted value, a defocusing amount is obtained. That is to say, the defocusing amount of the photographic lens is obtained by multiplying the value shifted from the focused position by the defocusing amount per shift movement. Therefore, there arises no inconvenience whether the defocusing amount or the above shifted value (displacement amount or displacement pitch) is used as the adjustment data. Changes in the flow chart in accordance with the above modified arrangement are shown in FIGS. 36A, 36B, 36C and only the differences will be described next. FIG. 36A shows the modified flow of the focus detecting adjustment 'T'; in which, the calculation of difference ΔDf at step #759 in FIG. 30 is now changed to be the calculation of difference (shifted value Δn) at step #759'. This calculation may be carried out by the same method disclosed in the above-cited reference U.S. Pat. No. 4,349,263. Further, at step #763', the calculation of average value ΔDf at step 763 in FIG. 30 is now changed to be the calculation of the average value (shifted value Δn). This average value comprises a value derived by adding up all the shifted values obtained by five-time focus detections and then dividing the sum by 5.

Figure 14:
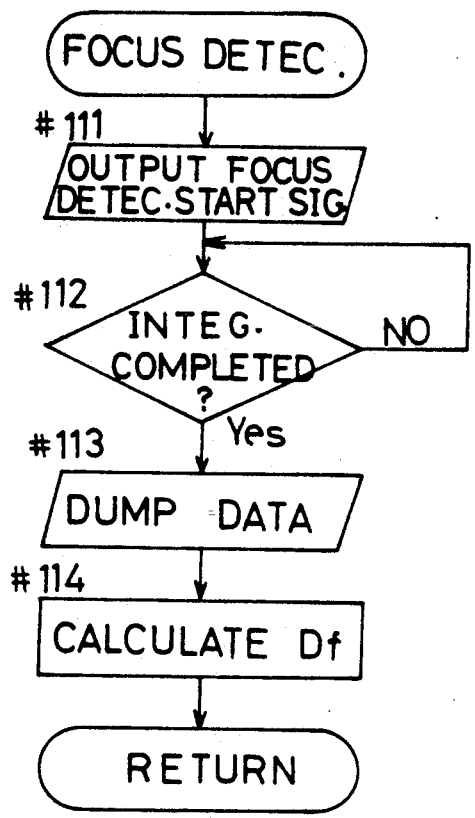

FIG. 35B shows the modified flow of the focus detection; in which, the calculation of defocusing amount Df at step #114 in FIG. 14 is now changed to be calculation of shifted value 'n' at step #114'. This shifted value may be obtained by the focus detecting method disclosed in the prior-art U.S. Pat. No. 4,343,263.

FIG. 35C shows the modified flow of the focus detection adjustment; in which, the difference data Δn is added to the obtained shifted value 'n' at step #121a, whereby the defocusing amount DF is derived from the following equation at step #121b:

defocusing amount $DF = (n + \Delta n) \times$ (defocusing amount per shift value)

What is claimed is:

1. A photographic camera, comprising:
    a first memory for storing an exposure time to be controlled as a logarithmically compressed digital value;
    a second memory constituted by an EEPROM and adapted for storing adjustment data as a digital value corresponding to an actual time;
    logarithmic compression means for outputting a logarithmically compressed adjustment amount by using the digital value read from said first memory and the adjustment data read from said second memory;
    adjustment means for calculating an adjustment exposure time value from the digital value read from said first memory and also from the adjustment amount output by said logarithmic compression means; and
    shutter control means, including,
    a shutter,
    logarithmic expansion means for expanding the adjustment exposure time value calculated by said adjustment means into an actual time unit to obtain an actual adjustment exposure time value, and
    control means for controlling said shutter based on the actual adjustment exposure time value.

2. A photographic camera, as defined in claim 1, wherein said logarithmic compression means obtains the adjustment amount (ΔTV) from the following equation $$\Delta TV = \log_2 (1 + \Delta ts\, 2^{TV})$$

in which Δts denotes the adjustment data read from said second memory and TV denotes the digital value read from said first memory.

3. A photographic camera comprising:
    light measuring means including;
    light measuring circuit for generating analog information corresponding to brightness of an object to be photographed, and
    an A/D converter for converting the analog information into digital information;
    an EEPROM for storing digital adjustment data for the adjustment of a digital output of said A/D converter;
    adjustment means for obtaining an adjusted object brightness value BVo' from the digital output of said A/D converter and from the digital adjustment data from said EEPROM;
    wherein said adjustment means calculates the adjusted object brightness value BVo' from the following equation:

$$BVo' = m \cdot BVo + n$$

in which, BVo denotes the digital information from said A/D converter of said light measuring circuit and m and n denote the digital adjustment data stored in said adjustment data memory; and
    exposure control means for controlling an exposure based on the adjusted object brightness value.

4. A photographic camera comprising:
    light measuring means, including;
    light measuring circuit for generating analog information corresponding to brightness of an object to be photographed, and an A/D converter for converting the analog information into digital information;

an adjustment data memory for storing digital adjustment data for the adjustment of a digital output of said A/D converter;

adjustment means for obtaining an adjusted object brightness value BVo' from the digital output of said light A/D converter and from the digital adjustment data from said adjustment data memory;

wherein said adjustment means calculates the adjusted object brightness value BVo' from the following equation:

$$BVo' = m \cdot BVo + n$$

in which, BVo denotes the digital information from said A/D converter of said light measuring circuit and m and n denote the digital adjustment data stored in said adjustment data memory; and exposure control means for controlling an exposure based on the adjusted object brightness value.

5. A photographic camera, as defined in claim 4, wherein said A/D converter is constituted by a double integral type A/D converter circuit.

6. A photographic camera system having light emission control means for controlling a flash light emission amount, comprising:

an electronic flash device;

a film speed memory for storing film speed information of a film in use;

an adjustment data memory for storing digital adjustment data for adjustment of a flash light emission amount of said light emission control means;

adjustment means for obtaining an adjusted film speed value SV' from the film speed information stored in said film speed memory and also from the adjustment data stored in said adjustment data memory; and light emission control means, including:
light receiving means for receiving light reflected from an object to be photographed and then for generating an electric signal corresponding to an amount of light received, a D/A converter for converting the adjusted film speed value provided by said adjustment means into an analog signal, and a light emission control circuit for generating a light emission stop signal and outputting said stop signal to said electronic flash device when it is detected based on the electric signal from said light receiving means and on the analog signal from said D/A converter that an amount of light reflected from the object has reached a predetermined value.

7. A photographic camera system, as defined in claim 6, wherein said adjustment data memory is constituted by an EEPROM.

8. A photographic camera system, as defined in claim 6, wherein said adjustment means calculates the adjusted film speed value SV' from the following equation:

$$SV' = i \cdot SV + j$$

in which SV denotes a film speed value stored in said film speed memory and i and j denote the digital adjustment data stored in said adjustment data memory.

9. A photographic camera system, as defined in claim 6, wherein said light emission control means further includes, adding means for adding the electric signal from said light receiving means to the analog signal from said D/A converter, and wherein said light emission control circuit, includes, charging means having a capacitor which is charged with electric current corresponding to the signal output from said adding means, and comparator means for comparing an actual charged level of said capacitor with a predetermined level and then for generating the light emission stop signal when the actual charged level of the capacitor has reached the predetermined level.

10. A photographic camera system, comprising:
a photographic lens;
an electronic flash device;
light measuring means for measuring brightness of an object to be photographed and then for generating light measurement data;
focus detecting means for detecting a focus condition of said photographic lens and for calculating a focus displacement amount;
film speed information input means for receiving film speed information;
exposure time calculating means for calculating an exposure time based on the light measurement data of said light measuring means and on the film speed information from said film speed information input means;
light emission control means for receiving light reflected from said object and for generating a signal for controlling a light emission amount of said electronic flash device;
an adjustment data memory constituted by an EEPROM for storing a first adjustment data for adjustment of the light measurement data, a second adjustment data for adjustment of the focus displacement amount, a third adjustment data for adjusting the exposure time and a fourth adjustment data for adjustment of the light emission amount;
first adjustment means for adjusting the light measurement data by using the first adjustment data stored in said adjustment data memory;
second adjustment means for adjusting the focus displacement amount by using the second adjustment data stored in said adjustment data memory;
third adjustment means for adjusting the exposure time by using the third adjustment data stored in said adjustment data memory; and
fourth adjustment means for adjusting the light emission amount by using the fourth adjustment data stored in said adjustment data memory.

11. A photographic camera system, comprising:
a photographic lens;
light measuring means for measuring brightness of an object to be photographed and then for generating light measurement data;
focus detecting means for detecting a focus condition of said photographic lens and for calculating a focus displacement amount;
film speed information input means for receiving film speed information;

exposure time calculating means for calculating an exposure time based on the light measurement data of said light measuring means and on the film speed information from said film speed information input means;

light emission control means for receiving light reflected from said object and for generating a signal for controlling a light emission amount of said electronic flash device;

an adjustment data memory constituted by an EEPROM for storing a first adjustment data for adjustment of the focus displacement amount, a second adjustment data for adjustment of the exposure time and a third adjustment data for adjustment of the light emission amount;

first adjustment means for adjusting the focus displacement amount by using the first adjustment data stored in said adjustment data memory;

second adjustment means for adjusting the exposure time by using the second adjustment data stored in said adjustment data memory; and third adjustment means for adjusting the light emission amount by using the third adjustment data stored in said adjustment data memory.

12. A photographic camera comprising:
light measuring means, including;
light measuring circuit for generating analog information corresponding to brightness of an object to be photographed, and
an A/D converter for converting the analog information into digital information;
an EEPROM for storing digital data related to operational tolerances of said light measuring circuit for the adjustment of the output of said light measuring means;
adjustment means for obtaining an adjusted object brightness value from the digital output of said A/D converter and from the adjustment data read from said EEPROM;
wherein said adjustment means calculates the adjusted object brightness value BVo' from the following equation:

$$BVo' = m \cdot BVo + n$$

in which, BVo denotes the digital information from said A/D converter of said light measuring circuit and m and n denote the digital adjustment data stored in said adjustment data memory; and exposure control means for controlling an exposure based on the adjusted object brightness value.

13. A photographic camera, comprising:
light measuring means, including;
light measuring circuit for generating analog information corresponding to brightness of an object to be photographed, and
an A/D converter for converting the analog information into digital information;
an adjustment data memory for storing digital data related to operational tolerances of said light measuring circuit for the adjustment of the output of said light measuring means;
adjustment means for obtaining an adjusted object brightness value from the digital output of said A/D converter and from the adjustment data read from said adjustment data memory;
wherein said adjustment means calculates the adjusted object brightness value BVo' from the following equation:

$$BVo' = m \cdot BVo + n$$

in which, a mark BVo denotes the object brightness value provided by said A/D converter of said light measuring means and marks 'm' and 'n' denote the adjustment data stored in said adjustment data memory; and exposure control means for controlling an exposure based on the adjusted object brightness value.

14. A photographic camera, as defined in claim 13, wherein said A/D converter is constituted by a double integral type A/D converter circuit.

15. A photographic camera system comprising:
light measuring means for measuring brightness of an object to be photographed and then for generating light measurement data;
film speed information input means for receiving film speed information;
exposure time calculating means for calculating an exposure time value as a logarithmically compressed value based on the light measurement data of said light measuring means and on the film speed information from said film speed information input means;
an EEPROM for storing an adjustment data used for correcting the logarithmically compressed exposure time value;
means for correcting the logarithmically compressed exposure time value by using the adjustment data stored in said EEPROM, and for obtaining an actual exposure time by logarithmically expanding the corrected exposure time value; and
exposure control means for controlling an exposure based on the expanded exposure time.

16. A photographic camera, as defined in claim 15, wherein said correcting means obtains the adjustment amount $\Delta Tv$ used for correcting the logarithmically compressed exposure time value Tv from the following equation:

$$\Delta Tv = \log_2 (1 + \Delta ts \cdot 2^{Tv})$$

in which $\Delta ts$ denotes the adjustment data read from said EEPROM.

17. A photographic camera system capable of controlling a flash light emission amount, comprising:
an electronic flash device;
light emission control means for generating a light emission stop signal and outputting the stop signal to said electronic flash device when an amount of light reflected by an object to be photographed has reached a predetermined value;
an EEPROM for storing digital adjustment data for adjustment of the predetermined value; and
adjustment means for adjusting the predetermined value based on the adjustment data stored in said EEPROM.

* * * * *

UNITED STATES PATENT AND TRADEMARK OFFICE
CERTIFICATE OF CORRECTION

PATENT NO. : 5,134,431

DATED : July 28, 1992

INVENTOR(S) : Toshihiko ISHIMURA et al

It is certified that error appears in the above-identified patent and that said Letters Patent is hereby corrected as shown below:

On title page, item [63], delete "514,737" and insert --504,737--.

Signed and Sealed this

Fifth Day of October, 1993

Attest:

BRUCE LEHMAN

Attesting Officer

Commissioner of Patents and Trademarks